(12) United States Patent
Seale et al.

(10) Patent No.: US 6,341,767 B1
(45) Date of Patent: Jan. 29, 2002

(54) SPRING FOR VALVE CONTROL IN ENGINES

(76) Inventors: Joseph B. Seale, 36 Briarwood La., Gorham, ME (US) 04038; Gary E. Bergstrom, 191 Miles Rd., Moreland Hills, OH (US) 44022

( * ) Notice: Subject to any disclaimer, the term of this patent is extended or adjusted under 35 U.S.C. 154(b) by 0 days.

(21) Appl. No.: 09/342,962

(22) Filed: Jun. 29, 1999

(51) Int. Cl.⁷ .................................................. F16F 1/06
(52) U.S. Cl. ........................ 267/169; 267/174; 267/178; 267/252
(58) Field of Search ................................. 267/166, 167, 267/169, 170, 174, 178, 179, 211, 212, 251, 252, 180, 155, 157, 166.1, 171, 202, 203, 221, 224; 248/609, 229.12; 24/523, 535; 123/90.65, 788.12, 788.13; 5/296, 275, 277, 278

(56) References Cited

U.S. PATENT DOCUMENTS

| | | | | |
|---|---|---|---|---|
| 895,492 A | * | 8/1908 | Neate | 267/166.1 |
| 980,343 A | * | 1/1911 | Ross | 267/180 |
| 1,932,785 A | * | 10/1933 | Irgens | 248/609 |
| 2,179,251 A | * | 11/1939 | De Right et al. | 248/229.12 |
| 2,297,753 A | * | 10/1942 | Emery | 267/174 |
| 2,708,322 A | * | 5/1955 | De Frances | 267/180 |
| 3,030,783 A | * | 4/1962 | Schmidt | 267/155 |
| 3,296,366 A | * | 1/1967 | Bronikowski | 267/179 |
| 3,643,934 A | * | 2/1972 | Bordes | 267/155 |
| 5,117,869 A | | 6/1992 | Kolchinsky | |
| 5,653,049 A | * | 8/1997 | Motoda | 38/66 |
| 5,909,791 A | * | 6/1999 | DiStefano | 267/167 |

OTHER PUBLICATIONS

"Soft–Landing Solenoids", Venture Scientifics, as reprinted from Engine Technology International, Jan. 1999 Annula Review.

* cited by examiner

Primary Examiner—Robert J. Oberleitner
Assistant Examiner—Thomas J. Williams
(74) Attorney, Agent, or Firm—Pierce Atwood; Chris A. Caseiro; Patrick R. Scanlon

(57) ABSTRACT

A spring system includes an axially moving center attachment located between two static attachments. Bi-directional axial center deflections cause push-pull restoration forces. There is little mechanical fixturing preload stress acting on material also subjected to high cyclic stresses. The spring material includes an unbroken path between the two static attachments, going through the center attachment. In one embodiment, the unbroken path is a length of wire bent into substantially parallel side-by-side helices clamped statically at the bottom of each helix. A moving attachment grips the center of the wire bridging diagonally between the tops of the helices. In a second embodiment, the unbroken path is a length of wire bent into end-to-end helices sharing a common axis and clamped statically at the axially opposite ends of the spring. A moving attachment grips the center of the wire where it bridges across the common axis in transition from a right-hand helix on one end to a left-hand helix on the opposite end of the spring.

6 Claims, 8 Drawing Sheets

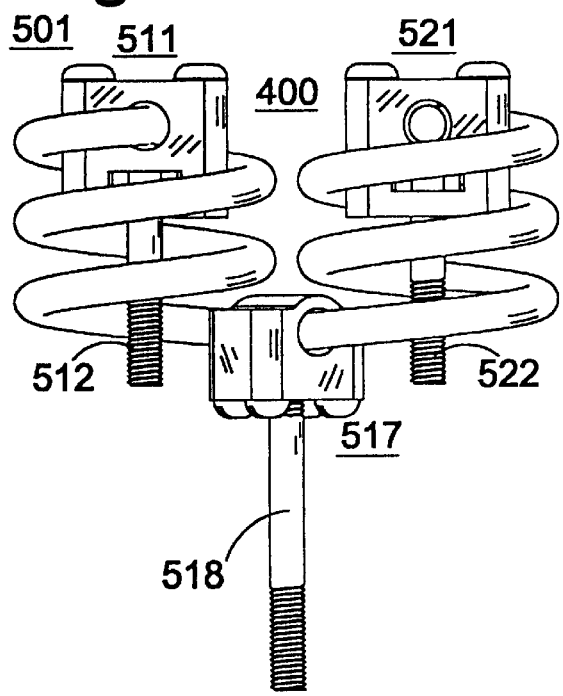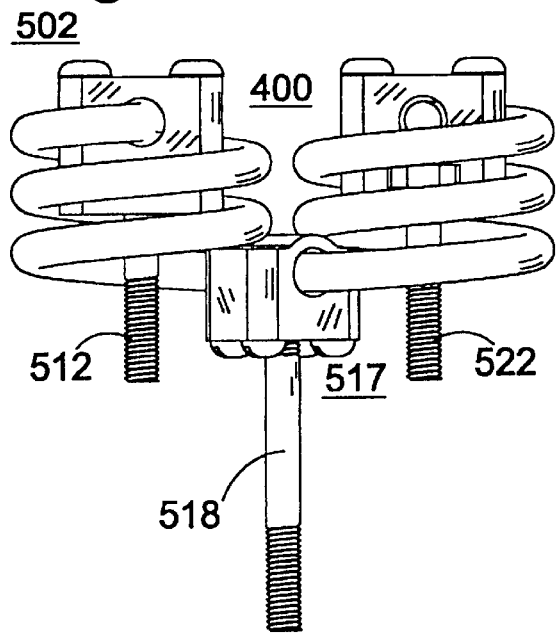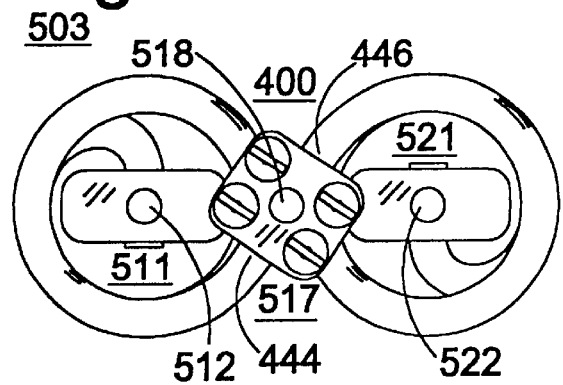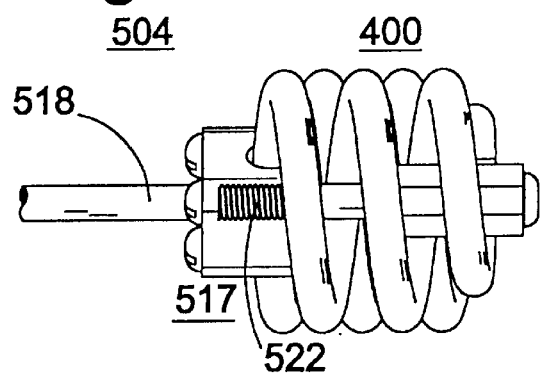

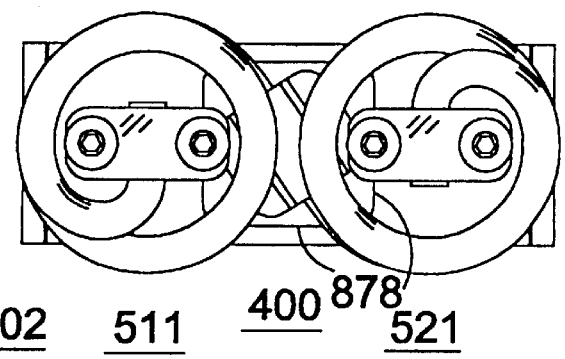
Fig. 8a
Fig. 8b
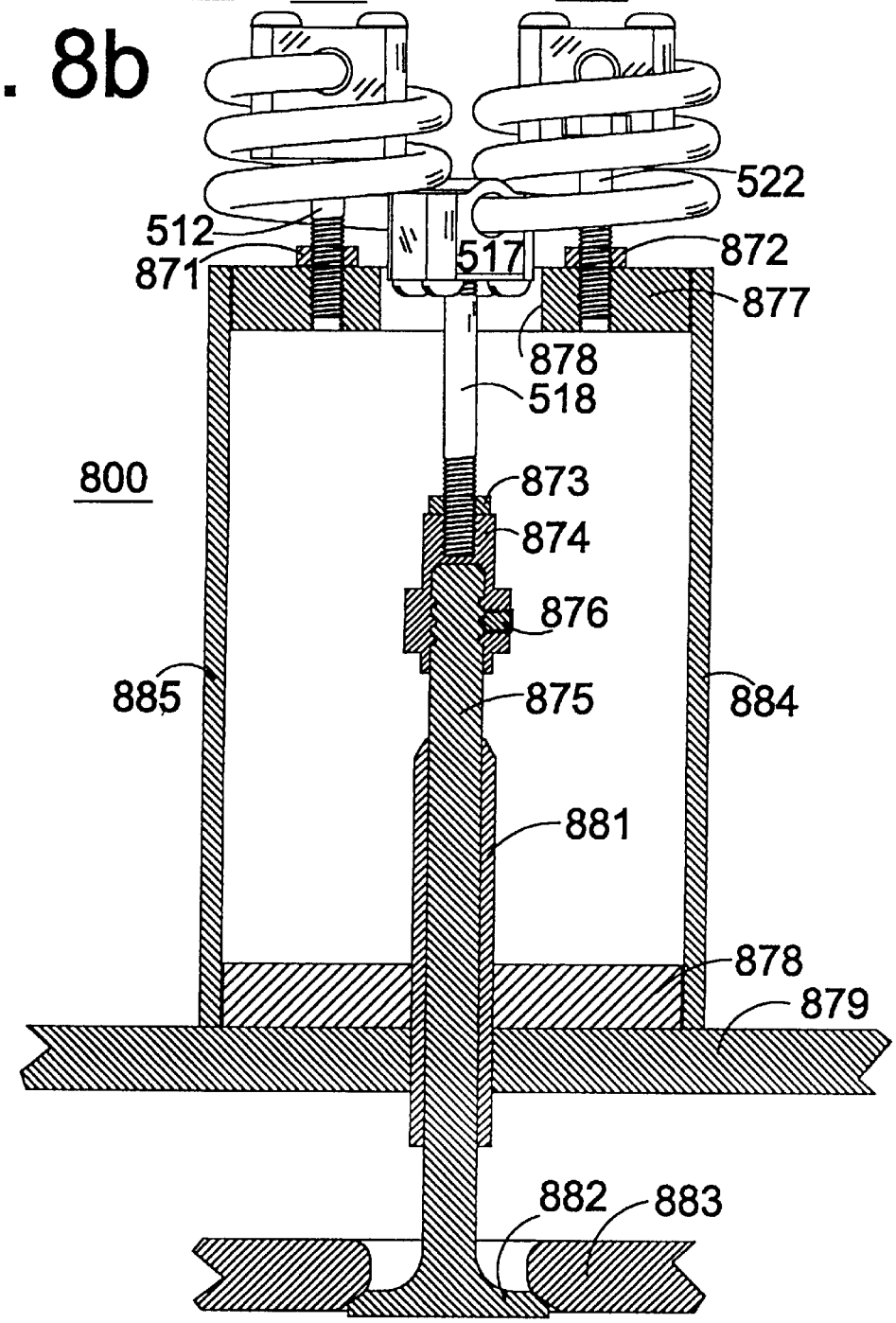

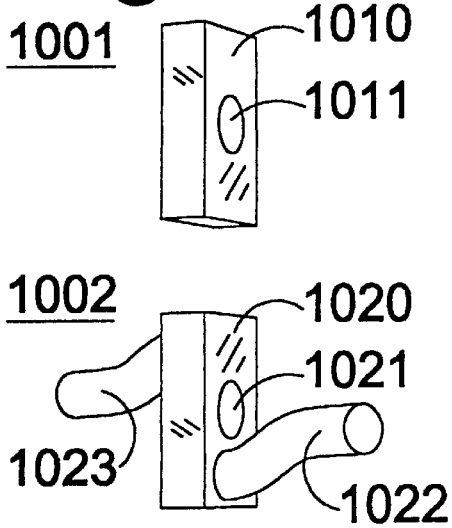
Fig. 10a
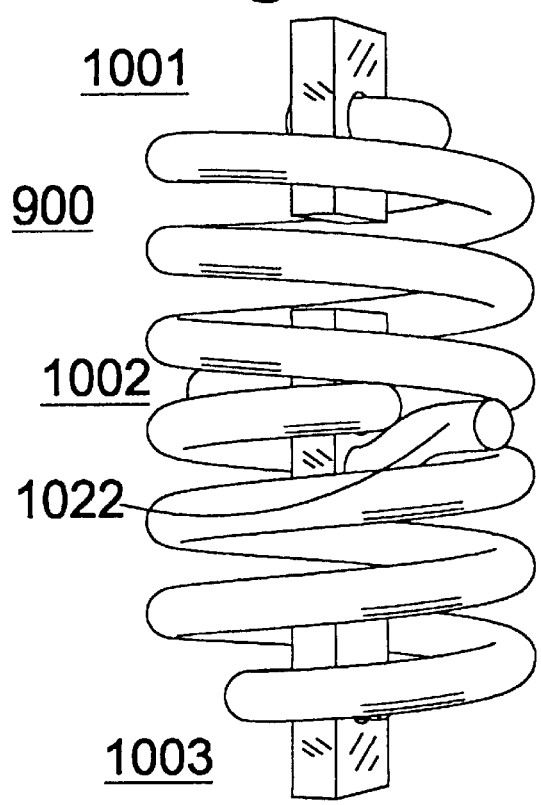
Fig. 10b
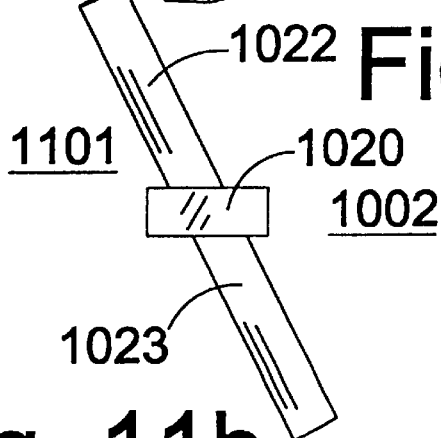
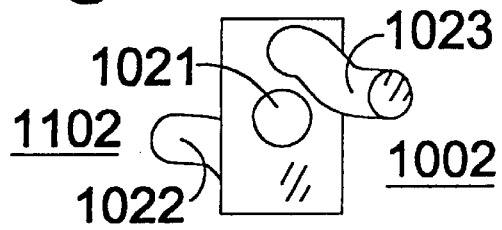
Fig. 11a
Fig. 11b
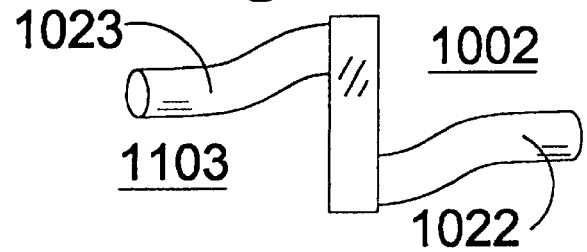
Fig. 11c

US 6,341,767 B1

SPRING FOR VALVE CONTROL IN ENGINES

BACKGROUND OF THE INVENTION

1. Field of the Invention

The invention relates to springs requiring a high ratio of stored energy to moving mass, so that the spring can move a payload through a specified distance in a very short time. The invention is applicable in the field of automotive valve springs, and especially to high performance springs used to restore electric valve actuation solenoids to a central position between two holding electromagnets.

2. Description of the Prior Art

Springs used to control fast motions with high accelerations must be able to exert a force through a distance, i.e. to transfer energy, while contributing minimally to the moving mass of the system. While a high performance spring will accelerate a payload mass through a specified stroke distance (e.g., the stroke of an electric valve actuator) in some specified short time period (e.g., 3 milliseconds), a poorly designed spring cannot even move its own mass through the specified distance in the specified time, with no payload at all. In a spring-and-payload system, some fraction of the effective moving mass ends up being spring inertia, with the remaining mass being the true payload. It is generally an advantage to maximize the payload fraction of the total moving mass, but in valve applications for internal combustion engines, and especially in the design of electric valve actuators for internal combustion engines, a high payload mass fraction is especially critical to overall performance. When the payload mass fraction is low, the spring mass and total mass of the system necessarily go up, in order to make the spring big enough to accelerate and move the valve payload through a specified stroke in a specified time. With an inefficient spring (i.e. a spring with a low ratio of exchanged elastic energy to effective moving mass), an increase in actuation force must accompany the increase in moving spring mass, implying more mechanical work performed per stroke, with a larger mechanism and at increased energy losses. In engines with a mechanical valve drive train, the actuation mechanism is a rotating cam, whose mass is not part of the mass to be accelerated with the valve and spring. In electric valve actuators, by contrast, the actuation mechanism includes an armature whose mass adds to the payload to be accelerated and decelerated quickly, by spring action, in transit between holding positions at full-open and full-closed. When moving spring mass is added, spring force must to be added to keep acceleration at a specified level. The increase in spring force calls for an increase in electromagnetic holding force, which in turn calls for an increase in armature mass. One sees that excess moving spring mass propels an upward spiral of mass addition to satisfy engineering requirements. Conversely, a reduction in moving spring mass for the same valve mass, stroke, and transit time, propels a spiral of mass reductions until the designer is faced with a desirable pair of design alternatives: either to make a faster valve, or to keep valve transit speed the same while transferring spring mass savings over into additional armature magnetic material, permitting achievement of increased electromagnetic efficiency.

Practical considerations for many high performance springs, particularly for electric valve actuation, usually include operation without fatigue and with minimal mechanical wear, and also compactness of the spring. Surface wear in highly stressed regions of a spring must be avoided, since wear accelerates stress-related failure. Attachment to a wire spring is prone to create localized stress concentrations, especially if the spring is attached where it undergoes significant bending or torsional moments. By far the most common solution to these multiple design challenges has been the helical compression spring. The wire in a helical spring experiences mostly torsion when the spring is compressed (or stretched, in the case of a tension spring design). It is well known that spring wire will store more energy per unit mass in a torsional mode than in a bending mode, lending an advantage to the helical compression or tension spring approach. In high performance compression spring designs, the end of the spring generally flattens out into a holding cup with a rolling motion causing no rubbing. A smooth transition is achieved from working spring wire to supported spring wire, minimizing stress concentrations. Compression springs whose ends are ground flat achieve a very small mass fraction that is non-working end mass. While it is an effective design, the traditional helical compression spring with flat ends leaves room for improvement, especially when used for electric valve actuation. In the electric actuation context, the valve is not preloaded to a mechanical stop, but instead sits at a neutral position roughly midway between its travel limits, until magnetic forces move the valve away from that neutral position either to a full-open or full-close position. The overall spring configuration must therefore exert force in two directions, toward the neutral position from either side. This bi-directional force is achieved, in the present art, by pre-loading a pair (or more than one pair) of compression springs against one another, so that one spring does most of the pushing from one side of center, while the other spring does most of the pushing from the opposite side of center. One finds that each compression spring stores two components of elastic energy: a variable energy component that contributes to the bi-directional centering restoration force, and a fixed energy component that provides compression preload but does not contribute to the bi-directional restoration. This mechanical fixturing preload serves to keep the ends of the spring seated firmly in their cups, since the end attachment is designed to push but not pull. By contrast, a built in "preload" of compressive surface stress, as achieved by shot peening of a finished wire spring, can help the surface resist crack propagation, thus extending fatigue life. Mechanical fixturing preload, as used to stabilize spring material with a net unidirectional force toward a confining surface, is a disadvantage if it creates a stress bias in material that is also highly cyclically stressed by spring operation. The functional price paid for the preload is that the spring wire must store substantially more total energy in relation to the "working" energy that cycles in and out of the metal with each stroke. While metal fatigue is associated most strongly with the cyclic component of stored elastic energy, the static preload energy component takes its toll on the design, cutting significantly into the capacity for cyclic energy storage. Hence, one might inquire whether springs without static preload, operating over a range including tension and compression, might offer improved performance over paired preloaded compression springs. The invention to be described below embodies an affirmative response to this query.

It is not easy to design an end attachment for bi-directional push-pull operation, especially if the spring wire must be gripped at the radius of the helix, where high torsion forces tend to twist the wire in its attachment and cause wear and fatigue. The desirable action whereby a compression spring flattens smoothly into an end cup is lost when one attempts to design for both tension and compression. In tension spring designs, an approach to reducing wear and stress at the end attachment point is to bend or spiral the end of the wire inward toward the center-axis, thus reducing or eliminating the force-times-radius couple that puts the spring wire in torsion. Wire spiraled inward to a center-axis attachment need only be gripped for force transfer, avoiding the formidable problem of wear-free gripping of a wire subjected to variable torsional stress. Existing tension spring designs achieve this objective, but adaptations of this kind of approach for combining tension and compression are lacking.

An example of a helical spring used in both tension and compression is found in U.S. Pat. No. 5,117,869 by Kolchinsky. This patent described a double-acting push-pull solenoid used in conjunction with a spool type cartridge valve. A single helical spring restores the solenoid armature and the valve spool to their center positions from either side. Details of the spring attachment are not shown or discussed in this patent, though the spring is illustrated. There is no indication that Kolchinsky's design achieves a high ratio of spring elastic energy to effective moving spring mass, an important issue to be addressed below. The armature shown in this patent is, in fact, quite massive in relation to its energy stroke, as compared with high performance solenoids used in automotive electric valve actuators. Thus, there is little indication of attention paid to moving mass reduction in this patent.

Another factor in electric valve actuator design is space occupied by the spring. The envelope of space available to the actuator is typically confined in the lateral dimension parallel to the engine crankshaft by the spacing between adjacent cylinders. Space taken up by a spring lying between the valve end and the actuator is space that must be spanned by the valve stem. As the valve stem is lengthened, the valve payload grows. An ideal valve actuation spring should reside entirely on the far side of the armature from the valve end, allowing the electromagnetic mechanism to be brought down as close as possible to the valve end. It would be advantageous to have such a "top-side" valve spring fit into a compact, low-profile package with limited lateral extension in the direction of the crankshaft, where cylinder spacing is a limiting factor. An ideal would be a shallow rectangular package with spring force derived from the middle of the package, while the spring is fixed at two or more points off-center. The spring should provide linear axial force without causing side forces or torsional moments.

OBJECTS OF THE INVENTION

It is an object of the present invention to provide a spring capable of a reversing push-pull force. It is a further object to minimize effective moving spring mass in relation to the push-pull work provided by the spring. A still further object is to achieve the above two objects in the context of electric valve actuation. In order to fit into a narrow and low-profile envelope, as is advantageous to the electric valve context, it is an object to provide a low profile spring fitting into a rectangular envelope and with the moving spring attachment at the center of this envelope, while fixed attachments are provided at two or more points off-center. A further related object is to provide a twin-spiral spring with two end regions of static attachment and a single center region of moving attachment, where torsion and bending forces from the two halves of the spring are in balance. A related object is to take advantage of the internal torsion and bending force balance in the wire by gripping the spring with a low-mass attachment subject only to delivered, reversing, linear spring force, with no torsional or bending force transfer being required of the attachment. Relating to such center-gripping for linear force transfer, it is an object to grip the spring wire with a soft material, e.g., rubber, compressed around the wire and complying to the bending and twisting motions of the wire without rubbing or generating localized stress concentrations. In order to avoid subjecting such soft gripping materials to damaging levels of negative-pressure and shear stresses, it is an object to compress and confine these soft materials in a thin annulus around the spring wire, such that reversing force transfer arises primarily from variable positive hydrostatic pressure developed in the soft material on alternating sides of the wire. It is an object to achieve properties described above with twin parallel side-by-side helices having the same handedness of rotation sense and joined by a crossover region gripped by a moving attachment. In an alternative embodiment, it is an object to achieve properties described above with twin in-line end-to-end parallel helices having the opposite handedness of rotation sense and joined by a crossover region gripped by a moving attachment.

These and other objects of the invention will be made clear by the description and drawings to follow.

SUMMARY OF THE INVENTION

A spring optimized especially for electric valve actuation consists of parallel side-by-side twin helices, formed from a single unbroken length of wire and joining where the wire at the end of one helix ceases to curve, crosses to the opposite helix, and then commences to curve in the opposite rotation sense, as viewed in plan, to make the second helix. When the plan-view rotation sense reverses, the direction of axial travel also reverses, such that if the "beginning" spring helix has a particular handedness (e.g., right handed), then the "ending" spring helix will have the same handedness (e.g., also right handed). The halves of the spring on either side of the center attachment are typically of the same shape, the one half being the image of the other half rotated 180 degrees, without mirroring, about a center axis generally parallel to the axes of the twin helices. Two generally static attachments to the spring are made at the two ends of the wire, those ends lying in a common plane perpendicular to the axis of spring motion. Moving attachment to the spring is generally made to the middle of the wire, in the center of an "S"-shaped crossover from the one helix to the other, at a point midway between the axes of the two helical sections of the spring. Motion of this moving attachment is generally parallel to the center axis described above, with spring force acting along this axis, which is designated the axis of spring action. This moving attachment typically consists of a cylindrical clamp encircling the wire and squeezing the circumference of the wire center via a compressed flexible or elastomeric sleeve between the inside of the clamp and the outer surface of the wire. This flexible sleeve transfers reversing push-pull force between the spring and an axially reciprocating shaft, while torsion and bending forces in the gripped portion of spring wire are internally balanced and require no force transfer through the clamp. The flexible or elastomeric material of the sleeve interface allows the wire to twist and bend slightly within the sleeve without rubbing or opening gaps, as the soft material follows the strains in the wire surface. In a design to reduce bending and torsion forces in either region of attachment at a static spring end, the spring helix at an end preferably spirals smoothly inward from its maximum helical radius to an attachment near to or on the center-axis of the helix. In a preferred static end termination topology, the wire spirals inward to a fairly sharp bend at a small radius off-center, then straightens abruptly as it passes across the center-axis of the helix. A cylindrical clamp and elastic sleeve grip this straight end portion of the wire in similar manner to the center attachment just described. In an alternative embodiment, each wire end terminates in a small-radius loop near the helix center, this end loop being gripped over an arc length between two washers or formed cups clamped tightly together. In a second alternative static termination topology, each wire end terminates in a central axial segment that experiences little bending or torsion stress and may be rigidly gripped from the sides, or pinned through the middle, or threaded like a bolt end, for axial force transfer.

In an alternative embodiment, two helices formed from a single unbroken length of spring wire are wound to form a monotonic axial progression about a common axis from one end to the other. The resulting spring is gripped at the two ends and at the middle. The end attachments are generally fixed, while the middle attachment is generally the moving or "active" attachment. The helices forming the two ends of the spring are of opposite handedness, one being right-handed and the other left-handed, while the clamped middle region joining these two helices is "S"-shaped, with a curvature reversal or inflection at the middle. The center of this "S" shape crosses the shared axis of the two helices. The pitch of the helix may be increased over approximately the last full turn approaching the central crossover region from either end, to allow space for gripping the spring wire at its center with a clamp and for attaching the clamp to external attachments. Motion of the center attachment relative to the end attachments is generally parallel to the common axis, with spring restoring force also being exerted along this axis, which is designated the axis of spring action. Attachment at the center of the in-line embodiment may be made with a cylindrical clamp and soft clamping materials, similarly to attachment to the side-by-side embodiment, except that the clamp is likely to require an "S"-shaped inner curvature to fit the sharply bending wire. Attachment means for the ends of the in-line embodiment may be similar to those for the side-by-side embodiment.

The in-line and side-by-side embodiments of the invention share the property that when the moving attachment travels along the axis of spring action, as defined separately for each of the two embodiments, then the responsive spring force acts substantially parallel to the axis of spring action, while the center of the spring wire has very little tendency to twist about any axis or rotation. The symmetry balance giving rise to this low-twist property arises, in part, from the non-mirroring symmetry of the side-by-side spring with its reversal of axial progression along the wire, and from the mirroring symmetry of the in-line spring with no reversal of axial progression along the wire.

BRIEF DESCRIPTION OF THE DRAWINGS

FIG. 5a illustrates, in side elevation, the spring of FIG. 4 as gripped by cushioned clamps at the center and ends, in a stretched state.

FIG. 5b illustrates the same view of the same spring as FIG. 5a except that the spring is compressed.

FIG. 5c illustrates the spring of FIG. 5a in plan view from below.

FIG. 5d illustrates the spring of FIG. 5a viewed from the right side.

FIG. 8a shows, in plan view from above, the wire and clamps of FIGS. 5a through 5d, connected to the framework of an automotive electric valve actuator, but showing only the actuator top plate with a cutout providing clearance for the spring center clamp.

FIG. 8b shows, in side elevation view, the assembly of FIG. 8a, here showing more of the electric valve actuator, including a base plate, top plate, supporting structure, and a valve with guide bushing and seat, but omitting details such as the electromagnetic components.

FIG. 9b illustrates, in perspective view from above, the same spring as FIG. 9a.

FIG. 10a illustrates, in perspective view from the side, the center and end clamps that hold the spring of FIGS. 9a and 9b.

FIG. 10b illustrates the same clamps as FIG. 10a, in the same relative positions, but situated on the spring of FIGS. 9a and 9b, which causes the clamps to be partly obscured.

FIG. 11a illustrates the center clamp of FIGS. 10a and 10b in a top-down or plan view, in coordination with the two elevation views to follow, for a standard three-view representation.

FIG. 11b provides a first side elevation view coordinated with FIG. 12a.

FIG. 11c provides a second side elevation view coordinated with FIGS. 11a and 11b.

DETAILED DESCRIPTION OF THE PREFERRED EMBODIMENT

Figure 3:
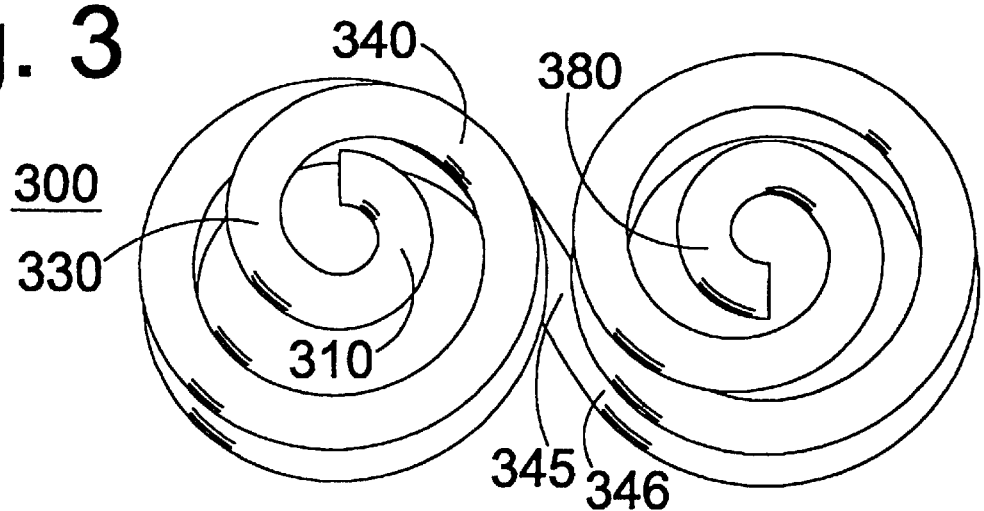
FIG. 3 illustrates, in roughly the same perspective as the static-side view of FIG. 2, a side-by-side double helix spring with its two static ends terminating in small semicircular loops that can be gripped securely against bending and torsion forces.
Figure 4:
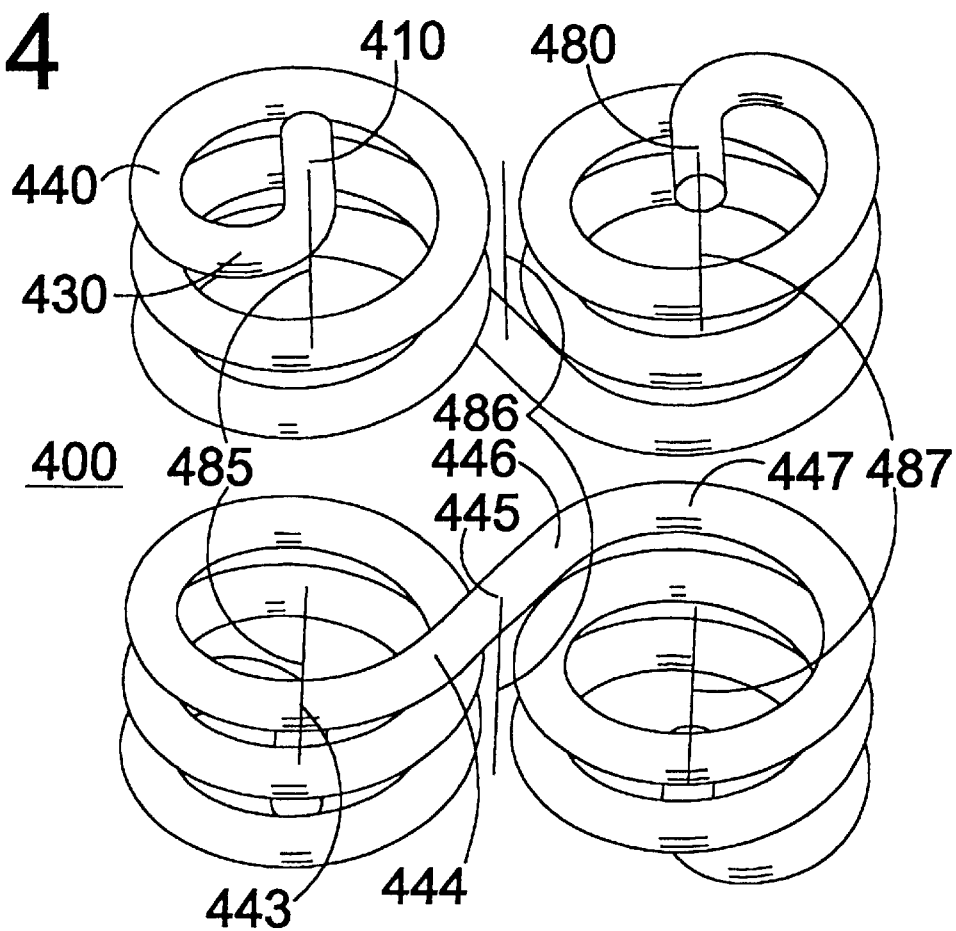
FIG. 4 illustrates, in two perspective views similar to FIG. 2, a preferred double helix spring embodiment whose ends cross the center-axes of the two helices in a plane perpendicular to the axes of the helices.

A preferred embodiment of the invention is illustrated in various views by FIGS. 5a–5d. This twin helix spring with padded cylindrical termination clamps will be discussed in detail later. To clarify how the spring functions, however, this discussion will begin with treatment of a single helix spring, which itself has merit where packaging requirements are not as restrictive as for the embodiment of FIGS. 5a–5d. Discussion of FIGS. 1–3 will concentrate on spring end attachments for operation in both tension and compression, which is a theme underlying the various embodiments of this invention. FIG. 4 will show the shape of the preferred spring topology in detail, without termination clamps, while FIGS. 5a–5d will show the complete spring system including the termination clamps. FIGS. 6a–6f will provide details of the termination clamps. Going deeper into the functionality of a termination clamp, FIG. 7 will indicate qualitatively the pattern of strain arising in the middle of a rubber sleeve inside a termination clamp, giving rise to pressures that carry axial loads without subjecting the elastomer material in the clamp to excessive shear strain. FIGS. 8a and 8b will show all the elements of the spring and mounting hardware of FIGS. 5a–5d as they mate to an electric valve actuator, whose electromagnetic details are not shown.

Figure 1:
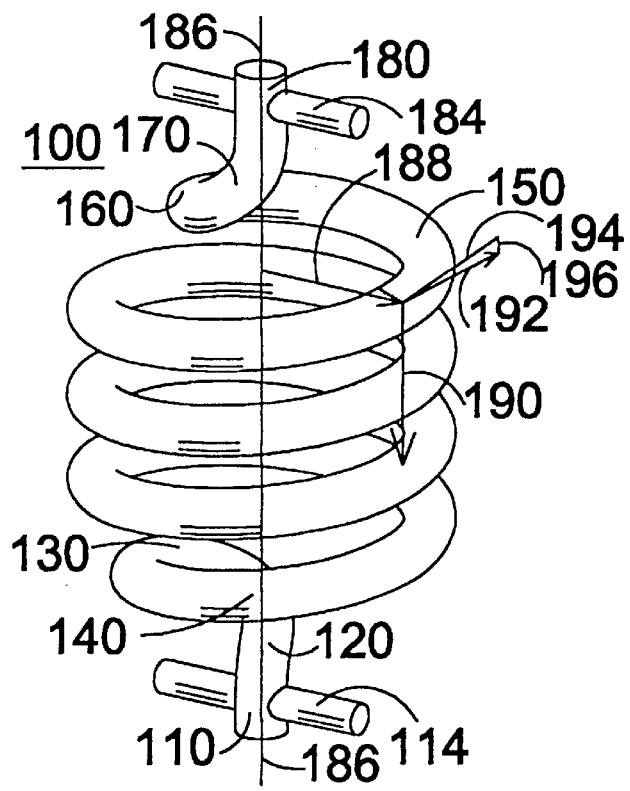
FIG. 1 illustrates, in perspective view, a single helical compression-tension spring that spirals outward to the helical diameter from axial end attachments, whose ends are drilled through and held by interference-fit pins. A vector diagram superimposed on the spring drawing illustrates the relationships among force, wire radius from the line of force, wire path direction, and moments of bending and torsion.

Referring first to the single perspective view of FIG. 1, the wire of spring 100 follows a path that begins with an axial segment 110 (at the bottom) following the spring helix axis 186, bends outward from axis 186 at 120, and then spirals outward with an upward helical component at 130 to a maximum helical radius. Note that 186 is a reference line, not a physical part of the spring, and is drawn showing transparently through the spring, as are vector-indicating lines and arrows 188, 190, 192, 194, and 196, to be discussed below. As the wire path approaches this maximum radius at 140, the path becomes a pure helix at constant radius up to 150, which corresponds to 140 and indicates the beginning of an inward spiral. By analogy to 130, 160 marks the region of inward spiral to a bend toward the helix axis at 170, analogous to 120 at the opposite end. The spring finally terminates with an axial segment at 180, analogous to 110, re-converging with axial line 186. Axial regions 110 and 180 are drilled and secured with pins 114 and 184, joining the wire ends to apparatus not shown. Alternatively, regions 110 and 180 can be threaded (not shown) with male threads for attachment to an external device with female threads to receive threaded regions 110 and 180.

By far the greatest stress in a spring wire is associated with some combination of bending and torsion. Bending is defined as a torsional moment vector acting perpendicular to the path-direction of the wire center, while wire torsion is defined as a comparable torsional moment vector acting parallel to the path-direction of the wire center. Along central axis 186 of spring 100, the total torsional moment vector is zero. There is only force, and wire stress associated with force is quite small compared to stress associated with a comparable force producing torsion through a radius of many wire diameters. One can say that spring wire at a torsional radius of many diameters is at a great mechanical disadvantage, which allows one to pump elastic energy into the wire and achieve spring action, but which also means that one must handle the stressed wire with care to avoid damaging it. The wire illustrated in FIG. 1 is drilled and pinned, or threaded for attachment, where its stress level is very low. Thus, the weakening of the wire caused by drilling it or threading it is of little consequence. As long as the hole through the wire is not too large, yet large enough for a pin of adequate strength, and as long as the wire makes a secure fit of slight interference on the pin, so that there is no rattling or rubbing or chafing, then the pin attachment can be designed to survive many reversing stress cycles. Similarly, as long as the threads of a threaded attachment do not cut too deeply into the wire, and as long as the threaded attachment fixture preloads the threads in some fashion so that there is no slop accompanying force reversals, then a threaded attachment can be designed to survive many reversing stress cycles. Other durable attachments will be disclosed below.

If the apparatus attaching to the ends of spring 100 allows for a free pivot at either end, at the places where force is applied, then of necessity the tensile and compressive forces exerted on the spring must act through line 186, passing through the end attachments. If the line of force did not pass through both free pivot attachments, the radial distance between the line of force and a free pivot would give rise to a torsional moment-yet a free pivot will not support torsion, proving by contradiction that force must act through the line of the pivots. A radius vector 188 is drawn as an arrow pointing from centerline 186 radially out to an arbitrary point along the helical path, at the center of the wire. The bending and torsional moments exerted on the wire at this point are analyzed as follows. If the bottom end of the wire is being pulled down with a force, F, then this force must be exerted across any slice taken across the wire center line, including the slice centered at the tip of vector 188—in effect, every part of the wire must support the end load. This force, as exerted at the tip of 188, is indicated by vector 190, pointing downward and parallel to line 186. The torque vector associated with radius vector 188 and force vector 190 is the cross product of these two vectors, drawn as vector 192 pointing perpendicular to the plane defined by vectors 188 and 190. Lines 194 and 196 represent vectors pointing, respectively, to the right and back into the diagram, and downward almost parallel to 190. The arrow heads on these two vectors are omitted for lack of room where the ends are very close to each other and to the tip of vector 192. Vector 194 is directed tangent to the helical path of the wire centerline, with tangency taken at the tip of 188. Vector 196 is perpendicular to 194 and extends from the tip of vector 194 to the tip of torque vector 192. Thus, lines 194, 196, and 192 define a right triangle with a long leg 194, a short leg 196, and a hypotenuse 192. 194 represents the projection of torque vector 192 onto a line tangent to the spiral path at the tip of 188. Thus, 194 represents the torsion force twisting the wire about its axis at the tip of 188. If an imaginary slice is imagined to cut across the wire at the tip of 188 and perpendicular to the wire axis, then the material in the wire on the cut face belonging to the top portion of the wire would be exerting torque 194 on the mating face belonging to the bottom portion of the wire. The torque exerted by this second face from the bottom wire is opposite in direction from 194, since the two forces are in balance for a wire in steady stress. 196 represents the remaining vector torque component after wire torsion vector 194 is subtracted from the overall torque vector 192. 196 represents a torsional moment acting across the wire axis, i.e. a bending moment. This bending moment vector, directed parallel to the bend curvature of the wire (regarding curvature like a vector rotation), acts very weakly to straighten the pre-bent curvature of the wire when the spring is in tension, as indicated by this diagram.

If the line of action of the force exerted on any spring is known, then the vector analytic approach just illustrated can be applied at any point along the wire path to derive the total torsional moment and resolve that vector into components tending to twist the wire about its path axis and to bend the wire. Wire bending moment plus wire torsion moment will always define a right triangle whose hypotenuse is the total torsional moment vector, which is the cross product of force times radius. As is well known, the resulting twist angle per-unit-length in the circular wire depends on the shear modulus, G, multiplied by the torsional area moment of inertia of the wire, "$I_q$" where $I_q=(\pi/2)r^4$ for circular wire of radius "r." The bending angle per-unit-length depends on the Young's modulus or Elastic modulus, E, multiplied by the bending area moment of inertia of the wire, "$I_b$" where $I_b=(\pi/4)r^4$ for circular wire. Note that with circular wire, the area moment associated with bending is only half as large as for torsion, since bending across the top-to-bottom direction of a wire stresses the top and bottom of the wire but not the sides, whereas torsion about the axis direction of a wire stresses top, bottom and sides, equally all the way around, involving double the effective area. For equal magnitudes of torsional and bending moments, the maximum stress in the skin of a straight piece of circular wire is twice the magnitude for pure bending as for pure torsion, since less area of the wire in bending is effectively available to support the moment in bending, as contrasted with torsion. Although hard metals, e.g., spring steel, support a higher stress magnitude in bending than in torsion, the magnitude of fatigue stress in bending is less than twice as great as for torsion (i.e., shear). Since only half as much effective wire area supports bending as contrasted with torsion, a wire will endure less long-term cyclic bending moment than cyclic torsion moment of equal vector magnitude—typically on the order of 80% as much cyclic stress in bending as in torsion. To arrive at this 80% figure, one needs a basis for comparing the unlike stresses of bending and shear. With respect to fatigue, a "common denominator" of bending and shear appears to be local concentration of elastic energy in the metal. If the elastic energy concentration is the same, then the level of fatigue is believed to be at least approximately the same, whether that elastic energy is associated with bending or torsion. Based on this analysis, the relatively greater weakness of wire in bending has implications for the optimum design of the double spiral springs to be illustrated and discussed below.

Figure 9A:
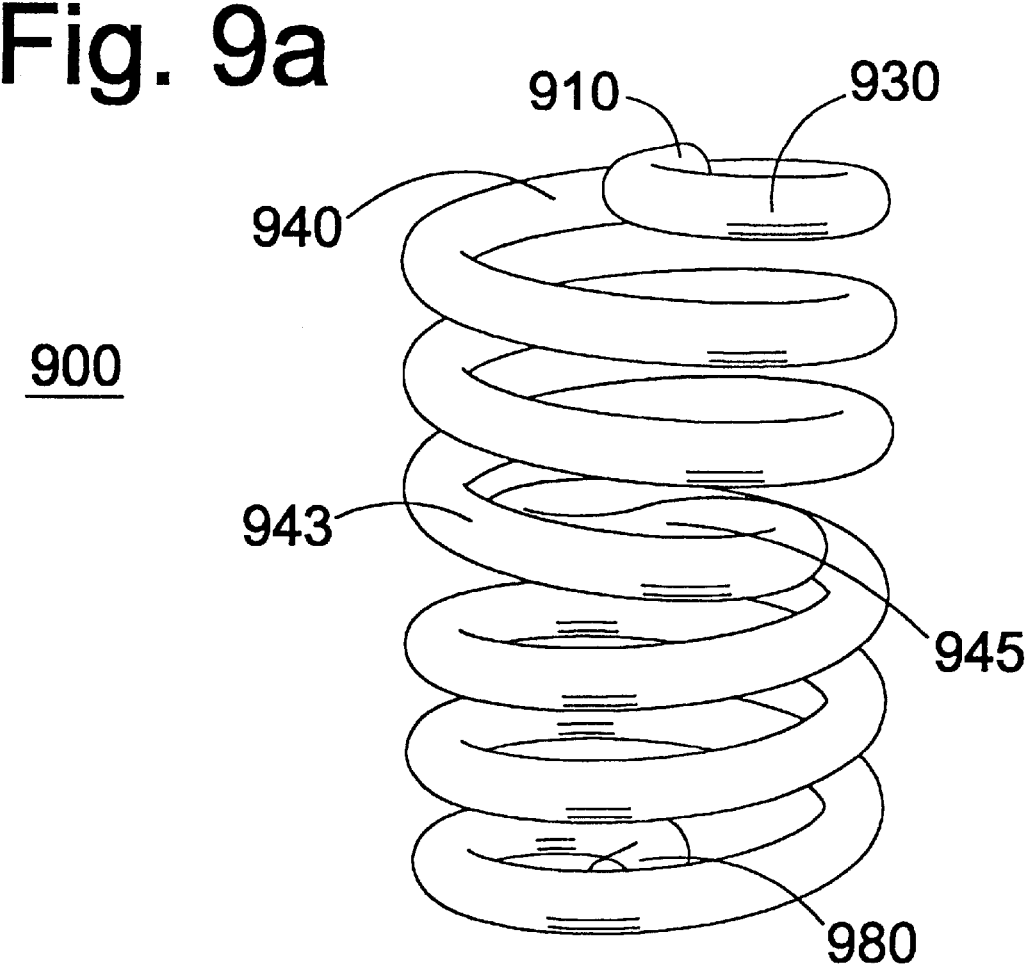
FIG. 9a illustrates, in perspective view from the side, a twin spiral spring consisting of left-hand and right-hand helices sharing a common axis and joined at a central crossover region. The spring is intended primarily for static end attachments and a moving center attachment.
Figure 9B:
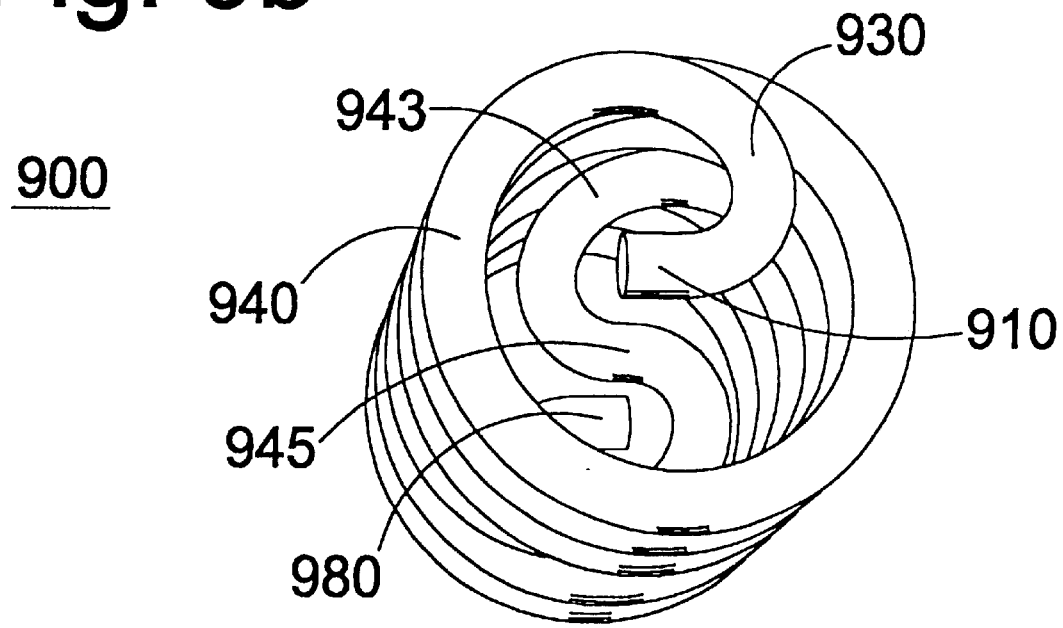

Another strength issue relating to torsional strength is curvature of the prebent spring shape. Torsional stress becomes more concentrated on the inside curvature of a wire than on the outside, resulting in fatigue failure at a lower cyclic torque for a highly bent wire, as contrasted with a straighter wire subjected to the same cyclic torque. Thus, a helical spring fails at a lower torsional moment than a straight torsion bar spring of the same size and metallurgy of wire. If a helical spring begins to unbend at its end and spiral out to a larger radius from the line of force, then the straightening wire can support a higher level of cyclic torsional stress simply because it is becoming less curved. Conversely, if a helical spring begins to bend more sharply and spiral inward toward a termination, care must be taken to tighten the curvature gradually when first departing from the helical radius. If the curvature radius is reduced abruptly at the helical radius, the wire will be made weaker before it has spiraled to a smaller radius to reduce the torsional moment arm. Thus, for the springs illustrated in this patent, the function R(theta), for radius "R" as a function of angle "theta" about the helical axis, has special properties in the region where "R" begins to decrease with an inward spiral. The radial derivative, dR/d(theta), is zero for a constant-radius helix. Departing from this zero derivative for an inward spiral, a discontinuity in dR/d(theta) would represent a kink in the wire, which must be avoided. A discontinuous jump from zero in the second derivative would represent an abrupt change in curvature. Too large a jump in curvature at the start of an inward spiral would create a weak spot in the wire, as discussed. A function R(theta) that is continuous in first and second derivatives at the departure from constant R offers desirable properties for designing the inward transition of a spiral. Such a function is used in the figures of this Specification, jumping discontinuously from zero only in the third derivative to give a gentle start to the inward spiral, followed by a rapid increase in the second derivative as the torsional radius of the wire is reduced, making the wire more tolerant of weakening by sharp bending. As a practical matter, if the wire is to be brought inward across the helix axis, as illustrated for the wire ends in the preferred embodiment of FIGS. 4, 5, and 8, and for the wire ends and middle in the embodiment of FIGS. 9a, 9b, and 10b, then too gradual a tightening of curvature at the initial inward spiral transition forces a later reduction in radius-of-curvature that is too extreme to fabricate by bending of wire stock. With a topology like that of FIG. 3, where the wire is clamped at a finite radius rather than brought across the center, the inward spiral can begin much more gently, keeping the wire near maximum strength at large radii from the force axis. The tradeoff is that the termination attachment must tolerate a non-zero total torsional moment vector, meaning that the wire will twist and/or bend to some degree in its attachment. The relative merits of the different approaches to spring shape will become clearer as various spring embodiments are described below.

Figure 2:
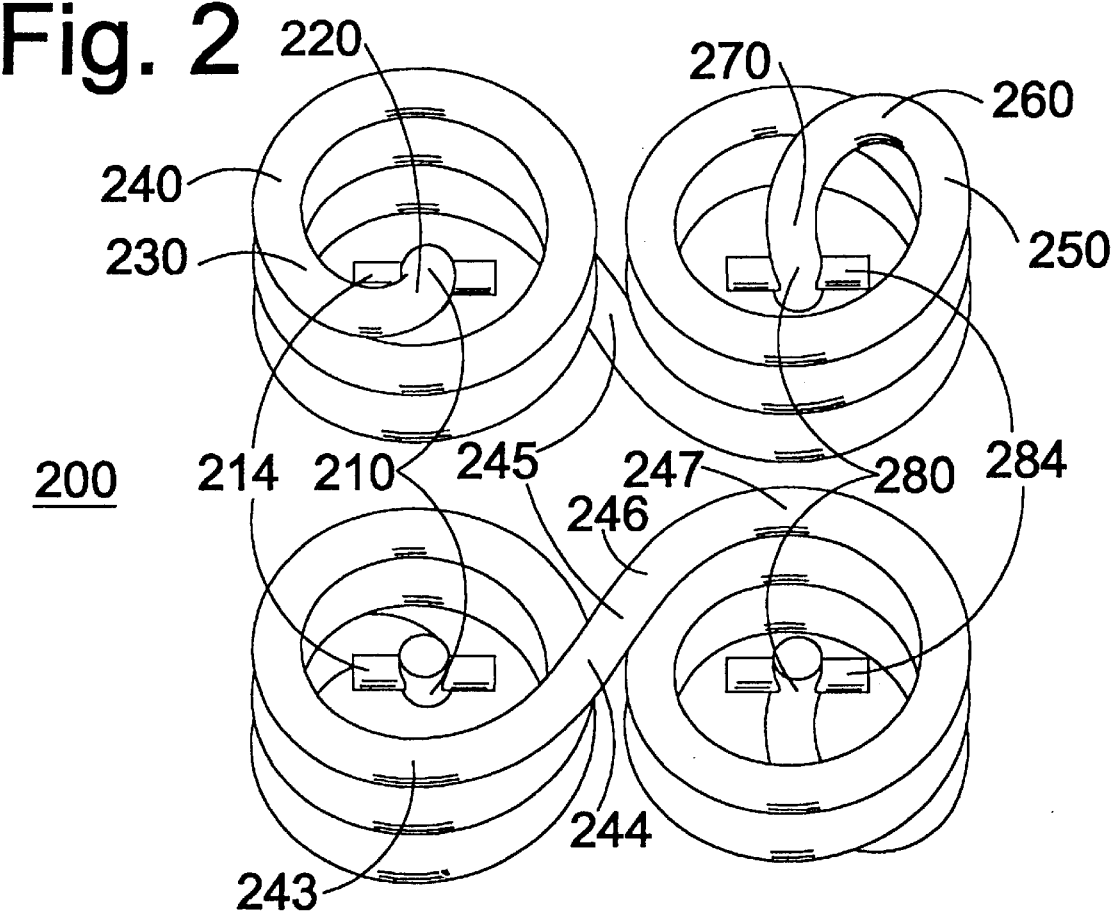
FIG. 2 illustrates, in two perspective views from the static termination side and from the opposite moving termination side, a side-by-side double helix spring with its two static ends terminated like the single helix of FIG. 1, except that the ends turn axially back across the middle of the helix to conserve space.

With the above stress considerations in mind, consider the spring shape 200 illustrated in FIG. 2 from twin perspectives, about midway between a top-down plan view and a side view in the upper illustration of the figure, and viewed from the diametrically opposite underside view in the lower illustration. Corresponding regions of the spring are labeled with the same number in both views. In this twin side-by-side helix, the end termination pins at 214 and 284 of 200 are similar to pins 114 and 184 penetrating the ends of straight helical spring 100, except that the ends of the wire including these terminations, at 210 and 280, point toward the inside of the helix instead of away from the middle, as is the case with 110 and 180 of spring 100. The terminations of spring 200 remain accessible and can be reached via the open ends of the half-springs. As with spring 100, the end terminations of spring 200 may also utilize male threads cut into the spring wire ends, with an attachment fixture having female threads. While a termination shape with the ends turning into the inside of the helix presents some fabrication difficulties, it saves space. Regions of the spring in FIG. 2 are numbered to indicate analogy to regions in FIG. 1, by preserving the same final two digits in FIG. 2 as the similar parts of FIG. 1 while using the leading digit to indicate figure number. A similar numbering convention is used elsewhere in this specification. When a structure or feature in a given figure is identical to, rather than merely analogous to, an item from a previous figure, then the label number is identical, including the leading digit. Following this convention, spring regions 230, 240, 250, and 260 of FIG. 2 are analogous to regions 130, 140, 150, and 160 of FIG. 1, with the difference that the bend of the transition region from axial to helical path brings the ends into the middle of a helical region in FIG. 2, versus away from the middle of the helical region in FIG. 1.

The crossover transition region between the twin helices beginning at 243 and continuing through 244, 245, and 246 and ending at 247, has no counterpart in the single helix of FIG. 1. It is instructive to note the similarity of topology for springs 100 and 200. Spring 200 departs from its helical path of constant radius at 243, being less curved than the helix from 243 to 244 and straight from 244 through the coil center at 245 and on to 246, where curvature resumes and reaches the curvature of the second helix at 246.

To understand this double spring in relation to a simpler single helix, consider a variation on spring 200 in which the end regions flip out, away from the centers of the helical regions, like spring 100. After this adjustment to 200, a relatively simple transformation will convert spring 200 into a spring like 100, except for a differing number of turns in the helix. The transformation (mathematically considered, though perhaps too extreme to be accomplished by bending and twisting actual spring wire) is to twist the right half of the spring relative to the left half about region 245 until the helix halves line up. After a 180 degree twist of the region from 244 to 246, a little bending adjustment between 243 and 247 lines up the two helix halves into a single helix. Observe that the helices on both sides of spring 200 have the same handedness, right-handedness in the case of the FIG. 2 illustration. Again thinking mathematically about a physically impossible situation, imagine that the left and right halves of spring 200 could occupy the same space over regions of overlap, without interfering with each other. Imagine, then, that the half helices are brought closer together until, in plan view, the two circles touch that represent the paths of the wire center in the left and right helical regions as projected onto an x,y plane. Consider specifically the upper spring view in FIG. 2, modified by bringing the left and right halves closer together until they hypothetically overlap in space. The spring spirals away from 210 via 220 and 230, then follows a downward helix beginning in the vicinity of 240. At a modified midpoint 245, now lying directly under the earlier spiral turns, the curvature of the wire path reverses abruptly, from an axially downward and tangentially clockwise rotation to an axially upward and tangentially counterclockwise rotation. Since the axial progress of the spiral reverses from downward to upward as the rotation direction reverses for clockwise to counterclockwise (with respect to the chosen view), the handedness of the two helices is the same. A downward axial force is exerted at 245, where the curvature reverses abruptly, and upward axial forces counterbalance this force, each of half the magnitude, at end terminations 210 and 280, thus stretching the spring. The torsion vector at 245 caused by pulling up on the spring at 210, to the left of 245, is precisely opposite to the torsion vector at 245 caused by pulling up at 280, to the right of 245. These opposite torsion vectors, coming from opposite ends of the wire, counterbalance one another, leading to a wire in torsional equilibrium at 245. The axial force applied at 245 likewise counterbalances the opposing axial forces, each half as large as the force at 245, operating from regions 210 and 280. Thus, this hypothetical spring with an abrupt reversal of curvature has no stress "problems" at its transition. When the spring halves are separated to eliminate overlap and obey the geometric constraints of a real spring, then the stress in region 245 becomes slightly higher than the stress along the spiral region at constant radius.

The perspective drawing outlines in the figures are derived from computer-generated solid models. Note that the projections through FIG. 8b do not include perspective, e.g. parallel lines do not converge to vanishing points, with the result that a helix at constant radius will appear to grow fatter as it recedes away from the viewer. The projections of FIG. 9b and following include perspective correction. While the projections without perspective correction may create certain optical illusions, they have the advantage that features everywhere have the same scale factor and lines that are parallel in space are parallel in the projected flat image—the preferred situation for shop drawings.

The double spring of FIG. 2 is normally secured statically at both ends 210 and 280, with a moving termination made at the middle, where the wire crosses over from the one helix to the other in the vicinity of 245. This choice is made to minimize effective moving mass. To better visualize how the spring is used, it is useful to preview the similar double spring illustrated with end clamp terminations in FIGS. 5a–5d, and the same spring and terminations mounted to restore an electrically actuated automotive valve in FIGS. 8a and 8b. A cylindrical clamp gripping the middle of the spring moves and exerts force along the same axis direction as the axes of the side-by-side helices. Equal pulling forces applied to both end attachments to the spring, in the middle of either helix, tending to elongate the helical segment, will generate little or no center-point moment in bending or torsion, since the radius from either end attachment to the line of force through that end is equal or nearly equal to a zero radius. The moment acting on the center of the spring may be associated with the force acting on the helix on either side, since these forces and their associated moment arms are in opposing torsional balance. The wire path at center 245 has no helical angle, i.e. no vertical path component, since the wire has become flat in the plane of the base common to both end terminations and perpendicular to the two helix axes, midway in its transition from spiraling away from the base plane to spiraling back toward the base plane. The wire path departs from tangential at 245 by a radial vector component. At the wire middle, the vector of total torsional moment (i.e. the cross product of radius times axial force, for radius taken from a helix centerline to the spring middle at 245) is parallel to a straight line passing midway between the two helix centers. The tangential component of the wire path vector across the middle is parallel to this total torsional moment, while the radial component of the wire path is perpendicular to this total torsional moment. The radial path component and the associated resolved torsional moment represent bending of the wire, specifically tending to make the wire bow convex-up in the middle when the middle is pulled up and bow convex-down (or less convex-up than the pre-bend) in the middle when the middle is pushed down.

The wire path should ideally be not too far from tangential across the middle, i.e. without too large a radial component, since that radial component resolves total torsion into bending, against which the wire is not as strong. Recall, on the other hand, that curvature weakens the torsional strength of a wire. As the wire of spring 200 spirals to greater radius and experiences a greater magnitude of total torsion, the wire becomes torsionally stronger if it straightens on approach to the spring middle, reaching an inflection point at the center-crossing.

Considerations of spring compactness may dictate that the outward spiraling of the left side of spring 200 should not begin before 243, the path point lying 90 degrees of angle short of the center crossover at 245. An earlier transition to outward spiraling would increase the smaller dimension of a rectangular box enclosing the wire plan form—i.e. the spring would require a larger package. The shape of the crossover transition in the double springs of FIGS. 2, 4, 5a–5d, and 8a–8b, consists of a stepwise increase in radius curvature at 243, giving a circular arc that is tangent to the helix at 243 and also tangent to a straight line extending from across 245 to 246. The curved portion from 246 to 247 is symmetric with the curved portion from 243 to 244. In FIG. 3, the wire path of spring 300 lacks an intermediate curvature comparable to the region from 243 to 244 or from 246 to 247, and makes the transition abruptly from the helical path at constant radius to a tangential straight line (except for some convex-upward bowing) bridging between the two helices. The theoretical stress performance of spring 200 with its transition region at an increased radius is slightly better than for the simple tangential connection of spring 300, because the center crossing of the former is more nearly tangential to a radius from the spiral center, resulting is a lower resolved component of bending stress (against which the wire is weaker, as contrasted with torsional stress). The curve shown between 243 and 247 has the length of its straight portion adjusted to minimize stress in the idealized mathematical situation where force is applied at a point at 245. The similar curve in FIG. 4, spring 400, from 443 through 447, is adjusted for the straight portion from 444 to 446 to be longer than a mathematical optimum, to give more straight attachment room for a cylindrical clamp. The stress compromise from this adjustment is very small. The degradation in stress performance going from optimum (as in spring 200) all the way to the simple straight-tangent shape of FIG. 3, spring 300, is quite small. The stress advantage obtainable by going to an optimum continuous function of curvature transition (rather than tangent arcs and a straight line) is very slight.

An important conclusion about overall spring performance is that if the gap between the sides of twin spirals is kept small, then the effective peak fatiguing stress level at the center of the spring is not substantially higher (e.g., typically just 10% to 15% higher) than along the helical path. If the wire is thick relative to the helical radius, then the transition across the middle represents a significant increase in radius from the nearest force axis (through the middle of the nearest helix), but the improvement in spring performance, due to becoming less curved near the center inflection, nearly offsets the effect of increased moment at the middle. Conversely, if the wire is thin, then the twin spirals can be brought closer together so that the crossover transition represents a smaller fractional increment in radius. As a result, the stress overhead is again relatively low.

The double spiral spring just described is bent from a single length of wire, with no splice or discontinuity to weaken the wire at the middle. While the wire can become highly stressed in the middle, the torsional forces are in balance, so that the wire can be pushed straight up and down in the middle without the wire tending to rotate about its axis at the attachment. The challenge for attachment to this wire is to transfer linear force to the wire gently over an area of the wire middle, avoiding localized stress concentration and rubbing. Ideally, the wire should be allowed to bend and twist freely in its attachment as the spring undergoes tension and compression. As the spring center is pushed and pulled axially, the bending and torsional angles encountered near the center of the spring will be very small, since the center of the spring is a point of zero rotation both in twist about the wire axis and in rocking with respect to a lateral line perpendicular to the wire axis. Nevertheless, the twisting and bending angles a short distance from the center point will be very difficult to confine or oppose without creating localized stresses of chafing, since the torsional moments and stresses associated with those small angular motions are large. As will be shown below, a soft, elastic attachment can be designed to grip the wire middle and transfer linear force over an area of wire surface while allowing the wire to twist and bend locally with little confinement. First, some alternative end attachments will be illustrated. While the end attachment of FIG. 2 conserves space and is highly effective, it may be difficult to implement in many situations, so alternatives are provided.

Spring 300 of FIG. 3 is similar to spring 200 in general, but has different proportions, fewer turns, a simpler shape of the center transition path (i.e. a simple tangent line, as discussed above), and most conspicuously, a different approach to end termination attachment. The straight axial segments 210 and 280 of spring 200 have their counterpart in flat semicircular segments 310 and 380. In a typical termination, the unthreaded shank of a bolt would just fit the inside curvature of region 310 (and similarly for region 380) and washers cut off into "D" shapes would be clamped securely around the loop of 310 from above and below, capturing the loop of 310, e.g., through 225 degrees of arc from the cut end of the spring to the place where the spring emerges from the flat side of the "D" shapes of the confining washers. This grip around a planar curve confines the wire securely against both torsion and bending forces experienced where the wire emerges from its clamping washers. The wire proceeds to spiral outward and transition from flat to an inclined helical pitch on either side of 330, while 340 marks the region where the wire reaches its helical radius. 345 marks the middle of the spring, while 346 marks the transition from straight to curved at the helical radius, corresponding to 246 of spring 200 but lacking a counterpart of the region of intermediate curvature from 246 to 247. Points corresponding to 243 and 244 of spring 200 are obscured in spring 300.

FIG. 4 illustrates a preferred embodiment of the spring component of the instant invention, while FIGS. 5a through 7 are concerned with the clamp component of the invention, along with a practical mounting configuration. Spring 400 is illustrated in its relaxed shape, under no tension or compression load, whereas later views show 400 in shapes of tension and compression. The curved base-plane segments 310 and 380 are replaced in 400 by straight segments 410 and 480, also lying in the base plane of the double spring and crossing over the center-axes of the two helices. 410 and 480 could cross the base plane at any angle consistent with the number of spirals in each spring coil and with the angular range of the spiraling path connecting 410 and 480 to the helical portion of the spring. It would be difficult to clamp segments 410 and 480 against rotation about the wire axis, lacking the purchase afforded by the curves of 310 and 380. The termination strategy, however, is first to design the spring to have minimal inherent tendency to twist or bend in the straight region, and second to clamp the spring softly, providing axial force while allowing the spring to rotate slightly in its clamp, both about the wire axis and about the two "bending" axes, without encountering large forces to oppose that rotation. The wire makes a transition from straight segment 410 to a sharply curved region spiraling outward in the vicinity of 430. Beyond 430, the curvature decreases rapidly, converging to the curvature of the helix at transition region 440. The lower of the two views in FIG. 4 shows the transition region between the two spirals, starting at 443, 90 degrees before the center crossing at 445. The axis for this helix on the left side is indicated by line 485, which is drawn transparently showing through the coil, as was axis 186 of FIG. 1. The line from the number 443 to the indicated point on the spring happens to end on axis line 485, because of the choice of viewing angle, but label 443 refers to a transition point on the spring, not to line 485. The curvature decreases at 443 and the curve from 443 to 444 follows an arc about a new center. The geometric construction of this new arc center calls for extending a line from 443 perpendicularly through the helical centerline 485 to a new center on the far side of 485 from 443. The spring path curve from 443 to 444 is an arc about this new center, tangent to the helical curve but spiraling outward to an increased radius until the path direction lines up directly with the chosen center at 445. Beyond this transition point, marked at 444, the wire path continues straight across 445 and to point 446, symmetric with 444. Line 486, shown extending down from the point labeled 445 in the lower view of FIG. 4 and also shown in the upper view where 445 is not indicated, indicates the axis of spring action. Like line 186 of FIG. 1, the axial force delivered by the spring, both in tension and compression, operates through line 486 which, as drawn, extends from the wire center at 445 to the level of the centers of end segments 410 and 480. The length and end points of line segments 485, 486, and 487 are inconsequential, since an infinite line coincident with any one of these line segments represents the axis in question. Continuing along the spring path from 446, curvature resumes, giving a path from 446 to 447 that is symmetric with the path from 443 to 444. The helix that continues from 447 is symmetric with the starting portion of the helix and continues to straight terminal segment 480, which is symmetric with 410. The axis of the second helical portion of spring 400 is indicated by line 487, which is symmetrically opposite line 485 with respect to axis 486. In the examples of this specification, including spring 400, axes 485 and 487 and corresponding axes of other double helical springs are parallel to each other and to axis 486 and its counterparts. There is no necessity that the helical axes be exactly parallel to the axis of spring action. In fact, refinements of the spring design may reveal small tilt angles for axes 485 and 487, or their equivalents, in relation to 486 or its equivalent, that yield incremental performance improvements, particularly considering the asymmetric influence of twisting and bending in the crossover wire region from 443 to 447, skewed as this wire region is with respect to a symmetry line connecting laterally from the ends of line segments 485 and 487 that lie at the same axial level as 445. Clearly, however, the tilt in any direction of axes 485 and 487 with respect to 486 will be limited to some small angle, certainly less than 45 degrees, in order for the twin helical spring components of spring 400 to function as axial-force helical springs contributing to a net axial restoration force in tension and/or compression operating through axis 486. The relationship between the halves of the spring is not mirror symmetry, which would reverse the handedness of the second spiral half with respect to the first half, but rather the symmetry of a corner mirror consisting of two mirrors forming a corner at right angles. One can also describe the geometry as if the beginning half of the spring were replicated and rotated 180 degrees about an axial line through 445 to form the second half of the spring, identical in shape to the first half.

It is useful to characterize the spring geometry carefully in relation to the axis of spring action, 486. The spring exerts a variable axial restoration force on a load through this axis of spring action. For spring 100, the comparable axis of spring action is along line segment 186. For spring 400, this axis of spring action is 486, which passes through crossover center point 445 and is parallel to first and second helical axes 485 and 487, centered in the helices on the left and right of 486. If one follows the path of the spring wire from one end to the other, from 410 to 480, one encounters a first helical region along which one progresses through a rotating motion about the first helical axis, 485, combined with axial motion with respect to axis 485 as well as the axis of spring action, 486. After traversing the crossover region, one encounters a second helical region along which one progresses through a rotating motion about the second helical axis, 487, in an opposite rotation sense (i.e., as clockwise and counterclockwise are opposite) from the first rotating motion, as the two rotations are both observed from the same side of a projection plane perpendicular to the axis of spring action, 486. This rotating motion in an opposite rotation sense about second helical axis 487 is accompanied by axial motion, with respect to 487 and axis of spring action 486, that is opposite in direction from the axial motion that accompanied progress along the first helical region. As stated earlier, this double reversal of rotation sense and of axial progress along a helix implies the same handedness for both helical regions. Progress along the spring path in the double helical spring of the instant invention is generally from a starting position, as projected onto the axis of spring action, to a middle termination position, representing the maximum extent of axial progress with respect to the axis of spring action, and finishing with a return to the same starting position, again as projected onto the axis of spring action. While the finishing position matches the starting position axially, the finish is displaced laterally with respect to the start. In spring 400, there is no axial component of motion in the starting and ending termination regions, 410 and 480. Axial motion starts at zero and changes smoothly and monotonically as one progresses along the spring path and the spring spirals out from a termination toward the helical region. Similarly in spring 300, the semicircular regions 310 and 380 lie in a plane perpendicular to the axis of spring action, so axial progress begins smoothly and monotonically from zero as the path spirals away from these termination regions to the helical region. The description of spring 200 is somewhat different, since the termination regions 210 and 280 are oriented axially. In this spring, there is a reversal of axial progress as the spring spirals outward from its end termination regions to the side-by-side helical regions. Ignoring the end termination and spiraling regions, however, all the side-by-side double helical spring variations on the instant invention have in common an axial progress along a first helix, a transition to a second helix that includes the point of maximum extent of axial progression, and then a reversal of both rotation sense and axial progress along a second helix, so that both the first and second helix are characterized by the same handedness. The axes of the two individual helices may be parallel to each other and to the axis of spring action, as in the figures of this Specification, or they may be angled differently and not parallel to the axis of spring action, as long as the angle between a helical axis and the axis of spring action is not too large, e.g., less than 45 degrees, to maintain qualitative consistency with the functional descriptions provided here.

FIGS. 5a–5d introduce the system of spring clamping, which is complementary to the design of the wire shape and contributes to the overall performance of the spring system. The clamping of the end-wire terminations is not critical, since the total torsional moment is low near the center of a helix, and options have already been described for these terminations. In FIGS. 5a–5d, the end terminations and the center terminations are accomplished by the same basic soft-clamping approach, with the differences between the end and center clamps arising from geometric constraints and design for twice as great a load at the center as at either end clamp. Of the four images in FIGS. 5a–5d, all showing double spring 400, images 501, 503, and 504, of FIGS. 5a, 5c, and 5d, show a traditional three-view rendition of spring 400 plus its clamps, in plan view (503), side elevation (501) and an end view elevation (504). Elevation views 501 and 504 show the spring at its maximum extension, in tension, as contrasted with the neutral spring shape shown in FIG. 4. The image of FIG. 5b, numbered 502, shows the same side elevation view as 501, except that the spring is shown in its fully compressed shape, as contrasted with the extended states illustrated in 501 and 504. Differences between extended and compressed states are not apparent in a plan view like 503, although slight changes in the projected helical diameter accompany transitions from a compressed to an extended state. The software used to generate the illustrated spring shapes does not take account of the slight changes in spring diameter accompanying helical compression and extension, so these slight changes are not portrayed in the figures. In addition to spring 400, FIG. 5a and several subsequent figures show left and right end clamp assemblies 511 and 521, each connecting to external anchorings via the threaded ends of bolts 512 and 522, whose heads are captured in the clamp in a manner to be illustrated in FIGS. 6d–6f. Center clamp assembly 517 captures the straight center portion of spring 400 between points 444 and 446, which are labeled in view 503 of FIG. 5c. This center clamp will be detailed in FIGS. 6a–6c. Coupling between 517 and external components is accomplished via doubly threaded stud 518, the top end of which threads into a blind hole in the bottom of 517. The bottom threads of 518 couple to a moving mass, e.g., an automotive valve and electric valve actuator mechanism, as will be indicated in FIG. 8b.

Figure 6A:
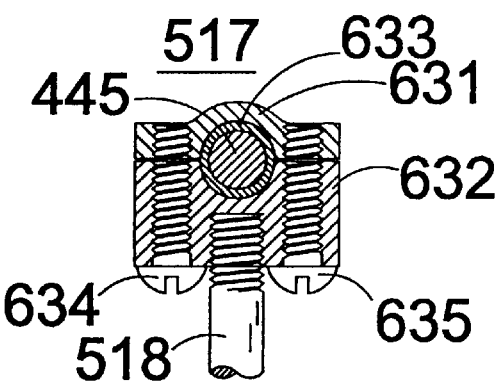
FIGS. 6a–6c illustrate, in standard plan and elevation views, the center clamp design shown in FIGS. 5a through 5d, with attention to compression and axial positioning adjustments.
Figure 6B:
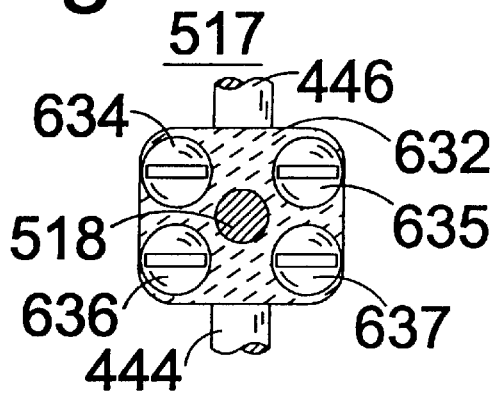
Figure 6C:
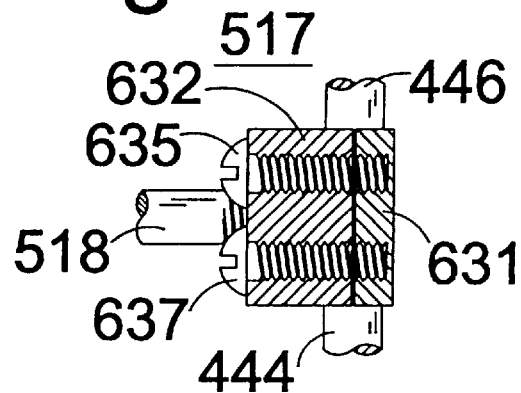
Figure 6D:
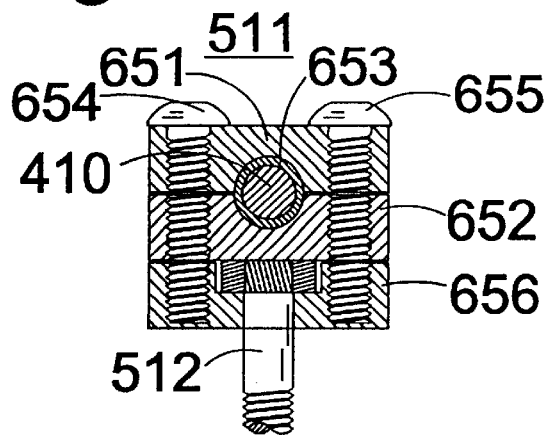
Figure 6E:
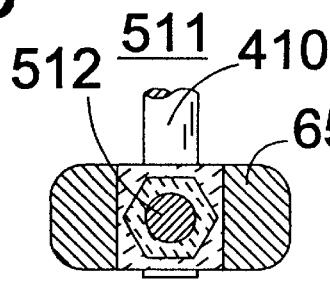
Figure 6F:
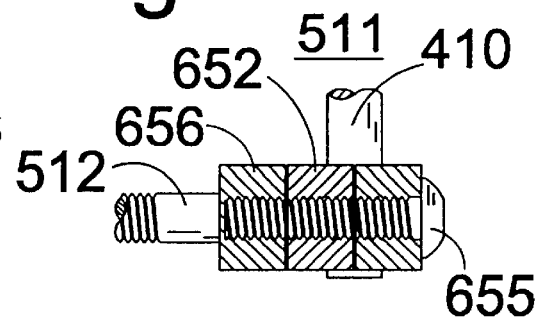

FIGS. 6a–6c illustrate some of the details of center clamp 517. FIGS. 6d–6f show end clamp 511, which is identical in design to end clamp 512. Both clamp 517 and 511 are illustrated in three standard views: plan, side elevation, and end elevation. Clamp 517 is seen to consist of two metal blocks, 631 on top and 632 underneath, which form a split cylindrical cavity between them, capturing rubber sleeve 633 and wire 400 at it center, at 445. Ends 631 and 632 of the clamp are drawn together by screws 634, 635, 636, and 637, whose heads press up against the lower surface of 632 and whose shafts pass through clearance holes in 632 and thread into holes in 631, where they pull 631 down toward 632. The screw heads are kept opposite the top surface of 631, where there is very little clearance when spring 400 is maximally compressed. The top surface of 631 is shown with a contour arching up over the center clamp area and cut back on either side to allow for spring clearance. The top end of stud 518 is shown threading into the blind threaded hole in the bottom of 632, where it is driven home and then locked in place with an adhesive or insert creating thread interference. The bottom-threaded end of 518 is cut off in the view of FIGS. 6a–6c. In the plan view of 517 are indicated regions 444 and 446 of spring 400, between which regions the wire is straight or nearly straight passing through clamp 517. There is a small gap between blocks 631 and 632, not obvious on the scale of FIGS. 6a–6c but clearly discernable in FIG. 7, indicating that the blocks are not intended to meet or "bottom out" against each other. Instead, all the force of screws 634, 635, 636, and 637 is intended to compress rubber sleeve 633 around the center of spring 400. Tightening these screws with a controlled torque establishes a controlled compression set for 633. As shown in FIGS. 6d–6f, the design of clamp 511 is similar in this respect, in that tightening of screws 654 and 655 establishes a controlled compression set for rubber sleeve 653 around straight end region 410 of spring 400. In the illustrated embodiment, clamp 511 is narrower than 517 in the dimension of enclosed wire length, in accordance with different spatial constraints and with a lower force to be transferred, permitting force transfer over a shorter spring wire length with similar peak stresses in the rubber sleeve. Screws 654 and 655 are on the top of 511 for adjustment access, as will be understood on viewing FIG. 8b. 511 is further designed to permit release and rotation of bolt 512 in 511 when 654 and 655 are loosened, permitting a height adjustment of the clamp. 511 consists of three metal blocks, 651 on top and 652 in the middle, enclosing the spring wire and sleeve 653, and block 656 on the bottom, with the head of bolt 512 captured between blocks 652 and 656. Bolts 654 and 655 pass through clearance holes in blocks 651 and 652 before threading into tapped holes in 656. The head of bolt 512 is captured in a gap between blocks 652 and 656 in which 512 can rotate whenever screws 654 and 655 are loosened sufficiently. This rotation permits height adjustment of 511. When 654 and 655 are tightened, the bolt head is clamped against rotation and sleeve 653 is compression-loaded around spring end 410.

Figure 7:
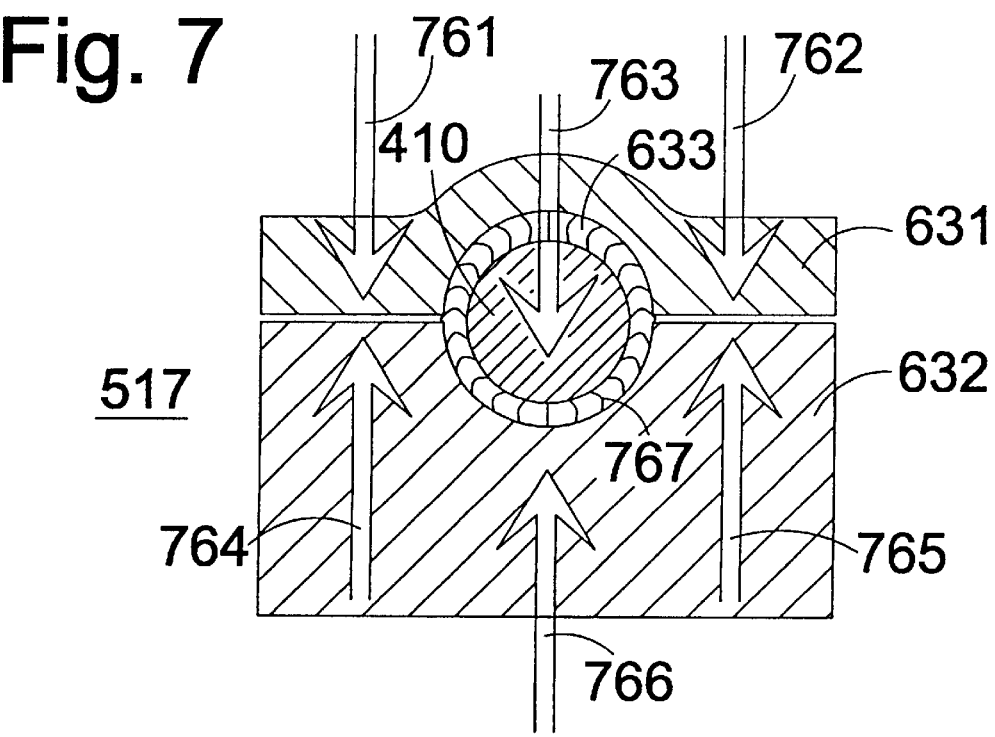
FIG. 7 shows a close-up side section view of the center clamp of FIG. 6a, indicating how a rubber sleeve will deform in shear around the wire circumference in response to a radial motion of the wire, thereby generating a large differential in hydrostatic pressure from one side of the wire to the other, to transfer linear force.

FIG. 7 shows a side elevation section through clamp 517, omitting details like the screws and connecting stud and showing, diagrammatically, the forces acting on rubber sleeve 633 and the resulting deformations of 633. Although force magnitudes will vary widely over time, with compression preload, etc., one may consider by way of example the situation where force vectors 761, 762, and 763, indicated by arrows, are equal in magnitude and push downward, opposed by matching but upward-directed force vectors 764, 765, and 766. Among these force vectors, the pair of vectors 761 and 764 may represent the matching opposed forces exerted, respectively, by the threaded ends and the head ends of the left hand pair of screws, 634 and 636, drawing blocks 631 and 632 together on the left side. Similarly, the pair of vectors 762 and 765 may represent the matching opposed forces of the right hand pair of screws, 635 and 637. Force vector 763 represents a downward force coming through spring 400 via the region between 444 and 446 (as shown in FIGS. 6a–6c and earlier). This force is counterbalanced by force 766, directed upward from stud 518 (as shown in FIGS. 6a–6c and earlier). As illustrated in FIG. 7, there is a gap between blocks 631 and 632, so that all of the force from the opposing force pairs 761–764 and 762–765 creates compression on 633 around 410. Blocks 631 and 632 are fabricated to form a split cylindrical cavity to enclose 633 and 410 with a small residual gap to permit compression preload adjustment without the two metal blocks bottoming out against each other. The addition of force 763, coming from spring 400, pushes 410 a short distance below the center or equilibrium location in the cavity formed between 631 and 632, as indicated by a slight asymmetry of the thickness across sleeve 633 at the top and bottom of 410. When force 763 is applied and pushes down, via sleeve 633, on clamp 517, a counterbalancing opposing force 766 arises in stud 518. Under conditions of high acceleration, forces 763 and 766 will not match precisely, and the imbalance between the two forces will account for the product of mass-times-acceleration that accelerates clamp 517 up and down.

To understand how rubber sleeve 633 is used to support substantial force concentrations without causing damage to the rubber, a few basic principles from the mechanics of solids are recalled here. When rubber is under a preload of compressive pressure stress, i.e. a uniform stress tending to compress and shrink the volume of the material, then the compressive modulus, or bulk modulus, of the rubber is much higher than the shear modulus of the material. Shear stresses tend to alter the shape of the material at constant volume, as contrasted with positive and negative pressure stresses, which tend to alter the volume of the material at constant shape. In discussions of wire deformation above, the shear modulus G described the ratio of shear stress to fractional deformation in shear. The modulus G is applicable to the present description of rubber. The Elastic or Young's modulus E described the ratio of stress/deformation for forces of compression or tension acting along a single axis, e.g., in a thin rod, where deformations of the rod toward expanding or contracting diameter go unopposed when the rod is compressed or tensioned along its length. The deformation described by E is responsive to a combination of pressure stresses and shear stresses. For describing rubber, it is useful to characterize the material approximately by a shear modulus G and a bulk modulus B, the latter describing the incremental ratio of positive or negative pressure stress to fractional change in volume. The characterization by linear coefficients G and B is approximate because rubbers and plastics deform according to nonlinear dynamics very sensitive to temperature and time duration. Textbooks and handbooks of mechanical engineering and solid mechanics give the relationships among the interdependent modulus parameters G, B, E, and the Poisson ratio. Any two out of these four parameters can be used to solve for the remaining two, thus completely characterizing, to a linear and time-independent approximation, the small-perturbation behavior of an isotropic elastic material. For the purposes of this discussion, the pair of parameters G and B are most useful for describing rubber, since G and B are very different and describe different and somewhat separable physical processes, as rubber responds to shear and pressure stresses. When rubber is subjected to compressive pressure stress, tending to shrink the volume of the material without deforming the shape, the molecules of the rubber squeeze together very compactly until there is little room for additional shrinkage and the material strongly resists further reduction in volume. One may compare the situation to the response of soft body parts of fish to extreme pressures in the deep ocean. Neither fish flesh nor rubber nor water experience significant deformation, nor any damage, at very high pressures. The molecules simply settle into a compact, stable arrangement. Negative pressures are a different matter. Under negative pressure, small gaps in a soft material tend to expand into cavitation bubbles, whose expansion rapidly destroys the polymer structure of the material. Shear stresses, which tend to alter the shape of a material at constant volume, drag molecules into new arrangements, disrupting the molecular bonds defining the original shape of the material. The description of a material as "soft" generally implies a comparatively large deformation response to shear stresses, and hence a low shear modulus, G. A common measure of the relative magnitudes of G and B is the Poisson ratio, which specifically characterizes the ratio of diameter change to length change of a rod subjected to tension and compression. If the modulus ratio B/G becomes "infinitely large," meaning that a material deforms in shear with virtually no change in volume, then a small fractional perturbation in the length of a rod will result in a fractional perturbation in diameter that is half as great, implying that the product of length-times-diameter-squared, which is proportional to volume, remains unchanged. The Poisson ratio in this case is precisely 0.50, i.e. one-half. The measured Poisson ratio in rubber at atmospheric pressure is typically in the vicinity of 0.49, indicating that the fractional change in volume of a rod is much smaller than the fractional change in length, by roughly two orders of magnitude. As rubber is subjected to positive hydrostatic pressure, i.e. a large compressive pressure stress, then the incremental compressibility of the rubber falls and the Poisson ratio approaches closer to the limit of 0.50. Hence, rubber at high positive hydrostatic pressures can be treated to a fairly good approximation as totally incompressible, having a modulus ratio B/G approaching infinity.

If a rubber bushing between hard metals is subjected to a high compressive preload, such that negative compressive stress never occurs, and if the bushing confines the rubber to an annular layer whose thickness is much smaller than the dimensions of radius and axial length, then the rubber will transfer linear forces directed perpendicular to the cylindrical axis, very largely by way of differentials between greater and lesser compressive pressure stresses between the sides of the sleeve nearer to and farther from the source of positive linear cross-axis force. The shear stresses in the rubber, associated with the shear modulus G, will be substantially smaller in magnitude than the differences in pressure stress, associated with the bulk modulus B, when the force acts perpendicular to the cylinder axis and the annular thickness is kept substantially smaller than the cylinder radius and length. It is common for various relatively soft formulations of rubber to withstand shear stress magnitudes on the order of 3.5 to 10.5 mPa (roughly 500 to 1500 psi) at failure, with fatigue performance limited to considerably lower stresses. In a practical geometry to transfer a linear force via clamps into and out of a hard metal spring, e.g. of steel, the magnitude of the force in relation to the magnitude of the gripped cylindrical surface of spring wire is likely to dictate stress magnitudes in excess of 10.5 mPa (1500 psi). This magnitude of linear force transfer can be achieved via a thin rubber sleeve preloaded into compression, since the stresses that transfer the linear force are differentials between positive compressive pressure stresses, which could also be described as positive hydrostatic pressures, occurring in different regions of the rubber sleeve.

The advantages of coupling linear forces via a soft material like rubber are clear. The soft material can conform and stick to the wire surface, deforming to follow the wire motions without rubbing and chafing and without creating damaging localized stress magnitudes. The wire can therefore undergo torsional and bending deformation within the sleeve with little constraint and negligible reduction of the inherent strength of the wire withstanding internal stresses. The shear modulus G in rubber, e.g., in a medium-durometer silicone rubber, is typically at or below 3.5 mPa (roughly 500 psi) for short time periods. Because of creep, the effective value of G declines when a stress is applied to a plastic or elastomer for a long time duration, leading to greater strain at constant stress. A typical magnitude for G in spring steel is around 82000 mPa (roughly 12 million psi). Thus, the shear modulus for steel is on the order of 24000 times higher than for rubber. If one attempts to clamp hard steel using metals softer than steel, in order to avoid damage to the hard steel, one finds that softer metals will tend to separate from the hard steel and rub with cyclic stresses, or they will fatigue and fail at strain levels that are tolerated by the hard steel. It is also very difficult to achieve clamping of a stressed spring wire without creating localized stress concentrations, which become centers for cracking and fatigue failure, aggravated by rubbing and chafing in the clamp. Going to soft materials, especially polymers and rubbers, can solve the problems of localized stress concentrations and wear to the spring surface. The problem of obtaining sufficient stress concentrations to transfer linear forces through soft materials is solved via compressive preloading and the geometric proportions of the clamp and soft sleeve.

A three-dimensional stress analysis for force transfer via an elastomer sleeve across a spring wire is illustrated in the plane of symmetry across the center of a clamp, where the analysis can be illustrated in a two-dimensional drawing, in FIG. 7. When force vector 763 presses cylinder 410 toward the bottom of the cylindrical cavity between blocks 631 and 632, counterbalanced by force vector 766 holding clamp 517 in place, then rubber in the sleeve on the bottom side of 410 will experience an increased hydrostatic pressure, while rubber on the top side of 410 will experience a decreased hydrostatic pressure. Rubber on the bottom side will tend to extrude out the ends, toward wire regions 444 and 446 as shown in FIGS. 6a–6c, as well as around the circumference of wire 410 from the bottom to the top. Positive preload on the rubber causes all the rubber, top, middle, and bottom, to tend to extrude toward 444 and 446, so the extra compression on the bottom side of the sleeve arising from forces 763 and 766 will cause the rubber on the bottom to extrude out the ends slightly more than under preload-only conditions. Symmetrically, the reduction in hydrostatic pressure around the top of sleeve 663 will cause the rubber on the top side to extrude out the ends slightly less than under preload-only conditions, but still with positive hydrostatic pressure everywhere except, possibly, very near the ends of the cavity, where harmless small negative pressures may occur. Neglecting end effects and considering the cross-section analysis of FIG. 7 as if for the case of an infinitely long cylinder, the downward displacement of 410 causes rubber to be displaced from the region under 410 circumferentially around the sides of 410 to the top region, where the displacement creates extra cross-sectional area to be filled by rubber extruded from the shrinking cross-sectional area below 410. Lines like the line 767 in the rubber are initially straight radial lines, in the absence of opposing forces 763 and 766. Application of these forces, resulting in the illustrated downward displacement of 410 relative to housing 517, leads to two kinds of distortion of these radial lines on the left and right sides of 410. The lesser of these distortions is a shear distortion where, e.g., a horizontal line from 410 across the annulus to the center of the gap between 631 and 632 becomes a sloped line, in order to connect the side of the cylinder in 517 to the side of the wire at 410 when 410 is displaced downward with respect to 517. The slope of this initially horizontal line is a shear deformation, whose associated shear stress tends weakly to center the wire in the sleeve. This lesser distortion is not readily discernable with the pictorial resolution of FIG. 7 because of the much larger second kind of distortion associated with the circumferential displacement of rubber volume from the bottom to the top of 410. This displacement distorts a straight line bridging from 410 to an inside surface of 517 into a roughly parabolic arc, whose end attachments to 410 and 517 do not move but the center of which is displaced circumferentially away from the bottom and toward the top of the annulus of 633. (FIG. 7 is illustrative but not quantitative in the shapes of arcs like 767 in relation to downward displacement of 410.) Neglecting the small chord-line shear slope between the ends of a parabolic arc line 767, the opposite slopes at the ends of the parabolas cause shear forces that, on both inside and outside surfaces of 633, pull cylinder 410 and the inner walls of 517 upward, while simultaneously pulling the bulk of the rubber in 633 downward circumferentially toward the bottom side. This downward pull on the rubber results in a gradient in hydrostatic pressure in 633, around the circumference, toward increased pressure on the bottom side and reduced pressure on the top side.

One can say that the pressure differential in the rubber operates at a strong mechanical disadvantage compared to the shear forces operating on the surfaces of 410 and 517. For a thin elastomer bushing sleeve that is not too short, the centering force associated with top-to-bottom hydrostatic pressure differential is much stronger than the centering force associated with simple straight-slope shear along the sides of 410. Over some small circumferential angle not far from horizontal to the right of the center of 410, the pressure differential from the bottom to the top of the angular sector, supported by stress in the curving rubber, operates over an area equal to the cylinder length multiplied by the annular thickness of 633. This product of pressure differential times area gives an upward force on the hypothetical angular wedge of rubber in the angular sector. Shear forces between the rubber and the exterior surface of 410, and between the rubber and the interior surface of 517, drag the rubber circumferentially downward and counterbalance the upward force of hydrostatic pressure differential when the rubber is in force equilibrium and not accelerating. Going circumferentially around 633 from bottom to top on the right side of 410, the pressure differentials just described for a thin annular wedge add cumulatively to a large pressure differential from top to bottom. The shear forces act on an effective area whose magnitude is roughly the product of cylindrical length times circumferential distance, summed over the outer surface of 410 and the inner surface of 517, over an effective subtended angle of 90 degrees on the right side of 410, plus an additional 90 degrees on the left side of 410. For computing mechanical advantage of hydrostatic pressure over shear force for a thin annulus, the hydrostatic pressure operates, over the left and right sides of 410, over an area equal to the length of the annulus multiplied by twice the radial annular thickness, thus accounting for both the left and right sides. As the radial annular thickness of sleeve 633 is made small compared to the average radius halfway through the thickness of the sleeve, the mechanical advantage of hydrostatic pressure differential over shear stress becomes large.

Based on the principles just described, formulas are readily derived to indicate the approximate magnitudes of shear stress, hydrostatic pressure differential, and linear force, for a given displacement of 410 relative to 517. When a cylinder of finite length is considered, a correction for axial relief of pressure differential must be incorporated to correct the two-dimensional formulas. One finds that when the square of end-to-end cylinder sleeve length exceeds twelve times the square of average radius to the middle of annulus 633, then the cylinder is becoming "long" and stresses around the annular circumference dominate. When the square of cylinder sleeve length is less than twelve times the square of average radius, then the cylinder is becoming "short" and axial pressure relief comes increasingly to dominate the stress analysis formula. To develop high pressures in relation to shear stress, it is desirable to be in the "long cylinder" regime, as defined by length-squared and twelve times radius-squared, as well as to have a large ratio of average radius, r, to delta-radius, Δr, the latter representing the thickness of sleeve 633. From among the formulas describing force, pressure, and shear relationships for sleeve 633, Eq. 1 indicates approximately the magnitude of the spring restoration constant "K" in relation to length "L" and average radius "r" and annular thickness "Δr" with shear modulus G for an approximately incompressible elastic rubber:

$$K = 12\pi GL(r/\Delta r)^3(1/(1+12(r/L)^2)) \tag{Eq. 1}$$

Note that G is in units of pressure and the product of G with length L is in units of force/length, i.e. the units of spring restoration constant K. The remaining terms in Eq. 1 are dimensionless numbers and dimensionless ratios. The ratio on the right end of Eq. 1 expresses the "long versus short" relationship described above, with this term approaching 1.0 in the limit for a very long cylinder, giving rise to a two-dimensional stress situation with no axial pressure relief. The cubed ratio of radius to delta-radius indicates the sensitivity of the analysis to relative thickness of sleeve 633.

While Eq. 1 might encourage the designer to create a very long, thin annular sleeve, e.g., for sleeve 633 or 653, one must remember that the sleeve coupling needs to tolerate limited bending and twisting of the spring wire within the sleeve without creating excessive strains in the soft material of the sleeve. One might also desire for the clamp on the spring wire to provide, to some degree, a free pivot for changes in the angle of the wire in twist and tilt as the wire passes through the cylindrical clamp. These considerations call for moderation in making the sleeve very thin or very long. In the larger spring design, one is faced with geometric constraints on the lengths of wire segments to be gripped.

The arrows illustrating force vectors in FIG. 7, at 761 through 766, would indicate that the vertical axial compressive preload force from either above or below might be roughly double the maximum magnitude of a linear force to be transferred from the spring wire to the enclosing cylinder across sleeve 633. To avoid negative hydrostatic pressures, the compressive preload force should always exceed the maximum magnitude of a dynamically changing force like that of 763, operating in either direction on 410. One must be cautioned that after a long period of time and after sleeve 633 or 653 or a comparable sleeve has been exposed to elevated temperatures, axial creep in the soft material of the sleeve will reduce the compression preload in the sleeve. One could conceivably compensate for such creep through mechanical means in spring metal, e.g., through the use of one or more Belleville washers to maintain a nearly constant preload force squeezing the spring wire and elastomer sleeve in spite of axial creep. For clamp the proportions illustrated in FIGS. 6a–6c and 7, the linear displacement of block 631 relative to block 632 (or for analogous components of any clamping system) in going from nearly zero preload to a design preload can be less than one percent of the radius of the spring wire, as seen in the cylinder section across the wire at 410 in FIG. 7. Such a small displacement going to full preload implies that it would be difficult to rely on a clamp whose sides, enclosing the spring wire, are brought together to a predetermined distance where the metal sides (e.g. 631 and 632) come together. Very tight geometric tolerances would be needed, including in the thickness of the rubber sleeve component of the clamp. A slight extruding of the sleeve material in long term creep could substantially reduce the compressive preload at fixed geometry. Thus, one can see the potential advantages of force preloading using spring metal, as contrasted with preloading by fixed geometric interference with a rubber sleeve. Alternatively, if the soft sleeve bushing material is preloaded to a significant excess of the minimum preload needed after an extended period of creep, then a preload in excess of the minimum will prevail even after creep has reduced preload from its high initial value to a relatively stabilized working value. If shear stresses in the rubber or other soft sleeve material are kept well within strength limits of the material, especially for dynamically changing, fatigue-producing stresses, then creep of the sleeve material will slow to a near halt after a period of time. Since elevated temperatures accelerate creep dramatically, a soft clamp system needs to be tested at the highest anticipated operating temperatures in order to evaluate the long-term performance of the system.

FIGS. 8a and 8b illustrate an example of how a spring suspension system, consisting of a double helical spring like 400 and a system of soft clamps like end clamps 511 and 521 and center clamp 517, can be incorporated into the geometry of an electric valve actuation system. Spring 400 and its clamps are illustrated in top-down plan view of FIG. 8a and in side elevation in FIG. 8b. Bolts 512 and 522, extending from clamps 511 and 521, are shown threaded down into metal block 877 at the top of the valve actuation assembly, with locking nuts 871 and 872 used to secure the two threaded bolt ends. A rectangular cut-out through the thickness of block 877 is indicated by vertical lines at 878 and on the opposite side of 878 in the side elevation, and by the lines also labeled as 878 in the plan view, plus the mirror counterparts of these indicated lines across the middle of the assembly, where the number 878 in all cases indicates a view of the boundary of the cut-out through 877. This cut-out allows for clearance of clamp block 517 below the top of plate 877, thus permitting a lower profile for the entire spring and clamp assembly. Double-threaded stud 518 emerging from clamp block 517 (which could be a continuously threaded rod instead of a stud with unthreaded middle) threads into the top of coupling block 874 and is secured with locking nut 873. An automotive valve, indicated in section by 875, inserts in block 874 from the bottom and is locked in place by set screw 876, plus possibly one or more additional set screws not shown in the section of this diagram. Thus, axial restoring forces are transmitted via block 874 between spring 400 and valve 875. Block 874 also serves to couple both spring 400 and valve 875 to the armature of an electromagnetic valve actuator, not shown but occupying the volume enclosed below top plate 877, above bottom plate 878, and between side braces 884 and 885 of actuator assembly 800. 881 represents the cross section of a linear guide bushing for valve 875. Valve guide end seals would commonly be used in such an assembly but are omitted, along with many other automotive details not essential to an understanding of the functionality of the spring and mount system of the instant invention. 879 represents, schematically and not in realistic detail, part of the outer surface of a manifold for intake air or exhaust associated with the cylinder below valve 875, as well as other possible cylinders. Note that valve guide 881 penetrates both 878 and 879 and may be an interference fit through one or both of these engine components. 882 indicates the opening/closing end of valve 881, opposite the valve end coupled into block 874. 883 indicates part of the cylinder head material, including an opening in which 882 is shown in a seated, valve-closed position. The side elevation of the spring and clamp assembly is labeled with the number 502, indicating the side elevation view from FIG. 5b when spring 400 is compressed. This state of compression corresponds to the valve-closed position indicated at 882 and 883, whereas an extended spring in full tension, as illustrated by side elevation 501, would correspond to the valve in its fully open position.

An Axially Extended Spring

The configuration of Spring 400 (FIG. 4 and several later figures) exhibits four physical properties, each of which results in a desirable performance characteristic.

Property: Static attachment in two places with a moving attachment symmetrically between the static attachments.
Result: A stable balance of forces in the spring material facilitates the design of a low-stress, low-mass moving attachment fixture.
Property: A balance of torsional moments in the spring material at the moving attachment.
Result: Translational motion generates little or no twisting, again facilitating the design of a low-stress, low-mass attachment fixture.

Property: Fabrication from a continuous and unbroken piece of material (e.g., spring wire) which is continuous and unbroken.

Result: No weak points where materials are joined, and no extra mass employed in joining materials.

Property: Attachments permit force reversals and push-pull operation without the need of static preload.

Result: Elimination of unnecessary static stress results in a greater sustainable cyclic stress and greater dynamic energy storage in the spring material, for a given spring mass.

An additional property of the previous design has been a low profile along the axis of spring action. Where packaging constraints call for minimum extent in lateral directions but permit more axial length, a new spring configuration retains the above four properties in an elongated package. This configuration is illustrated in separate views, from the side and from above, in FIGS. 9a and 9b. As shown in both figures, Spring 900 is made from a single length of spring wire, with a moving attachment region located midway between two fixed attachment regions at either end of the wire length. The fixed attachments at 910 and 980 resemble the fixed attachments at 410 and 480 of spring 400, with the possibility of fixturing using a clamp like 511. By analogy to the transition from a straight wire segment across the helical axis at 410 to a sharply curving region 430 at low radius, transitioning into a lesser constant helical curvature at 440, spring 900 is straight at 910, has a sharp curvature at 930, and transitions smoothly to the helical curvature of 940, which continues to the vicinity of the middle of the spring. Where spring 400 begins a transition toward zero curvature at 443, spring 900 begins a transition toward increased curvature at 943, as if the spring were approaching a termination symmetric with the start of the spring at 910. Instead of terminating, however, the spring undergoes an inflection and reverses curvature at 945, transitioning to a second half of the spring that is like the first half except for two transformations: first, mirroring through a plane perpendicular to the common helical axis; and second, rotating the mirror-image spring 180 degrees about the helical axis in order to mate the ends of the original and mirror-image springs. This is a description of topological transformations, not of manufacture, which involves winding the entire spring shape from a single unbroken length of wire stock. Since the second half of the spring is a mirror image of the first half, it has the opposite handedness of the first half. The two helices share the same axis line. The wire path crosses this axis line at its curvature inflection point at 945. In the illustration, for example, the first spring half extending from 910 to 945 is a left-hand helix, while the second spring half extending from 945 to 980 is a right-hand helix. Viewing the spring from above as in FIG. 9b and moving down from the top at 910, the wire path goes counterclockwise and downward about the spiral axis, then reverses rotation sense at 945 and continues clockwise and downward about the spiral axis to the termination at 980.

Spring 900 shares a balance property of spring 400, that torsional forces through the centers of the springs, at 945 and 445, balance with very little rotation when the centers are deflected along the axis of spring action. In the case of spring 400, the axis of spring action at 486 was parallel to the axes of the twin side-by-side helices and passed through center 445. In the case of spring 900, the axis of spring action is the single axis common to both the left-hand and right-hand helices of the two spring halves. Analysis shows that, to substantially neutralize twisting tendencies, the side-by-side helix configuration of spring 400 calls for an "S" shaped region, exterior to the helices, joining helices of the same handedness, both progressing away from the joining region in the same direction along the axis of spring action. By contrast, twist neutralization for the in-line or common-axis configuration of spring 900 calls for an "S" shaped region, interior to the helical cylinder, joining helices of opposite handedness, with the two helices progressing away from the joining region in opposite directions along the axis of spring action. The much greater rate of change in curvature through the inflection at the center of 900 calls for a shorter axial clamp extent, or for a clamp whose interior is curved to match the "S" shape of the gripped spring wire. For both springs 400 and 900, symmetric push-pull operation is possible without spring preload, which favors a higher fatigue-free cyclic stress and better energy/mass performance than can be achieved in strongly preloaded springs. In both springs, fabrication from a single length of spring wire, whose cross section may be circular or non-circular (e.g., square), affords the greatest possible fatigue strength and energy storage capacity in relation to moving mass.

Clamps to couple forces to the ends and middle of spring 900 are illustrated by themselves in FIG. 10a, and in the same relative positions but holding the spring in FIG. 10b. The clamp drawings omit details and are intended only to illustrate where spring 900 is clamped and how one might bring attachment rods out from the middle of the spring with reasonable clearance. It is assumed that each of the clamps includes means, not shown, for splitting the clamp and closing it around the spring wire. Also not shown are bushing sleeves on the insides of the three clamps, functioning like the bushing sleeves 633 and 653 discussed in reference to FIG. 6 and, for sleeve 633, also in reference to FIG. 7. Top clamp 1001, capturing spring 900 around 910 (shown in FIG. 10b, but with label 910 appearing only in FIGS. 9a and 9b), and bottom clamp 1003, capturing spring 900 around 980 (also shown in FIG. 10b, but with label 980 appearing only in FIGS. 9a and 9b), are shown in FIG. 10a as rectangular blocks 1010 and 1030 with bushing holes 1011 and 1031. As mentioned, means for splitting these blocks and closing them around the spring wire are not shown. Center clamp 1002, capturing spring 900 (FIG. 10b) around point 945 (as visible and labeled in FIGS. 9a and 9b), includes two components in addition to rectangular block 1020 and bushing hole 1021 (FIG. 10a). 1002 differs from 1001 and 1003 in having curving, oblique bars 1022 and 1023 extending from body 1020 from above and below hole 1021. The shapes of these bars is clarified by the standard three-view illustration of 1002 in FIGS. 11a, 11b, and 11c. View 1101 in FIG. 11a shows 1002 from above. View 1102 in FIG. 11b shows 1002 in side elevation, looking through hole 1021. View 1103 in FIG. 11c shows 1002 in a second side elevation, at right angles to view 1102. In view 1101, extensions 1022 and 1023 are seen to slope at an angle relative to the axis through the center of hole 1021. In views 1102 and 1103, 1022 and 1023 are seen to originate below and above 1021 (see also FIG. 10a), curve toward the center plane including the axis of 1021, and curve back toward parallel with that center plane near their ends. FIG. 10b, illustrating 1001, 1002, and 1003 in relation to spring 900, shows how the shape of 1022, in particular, brings this extension of the clamp out past the loops of 900 with reasonable clearance. A more complex curvature to 1022, curving to the left instead of going straight as shown in the perspective of view 1101, would afford still more clearance. In another approach to increasing clearance without substantially increasing the length of spring 900, the helical pitch of the wire could be increased locally, for roughly the first full helical revolution on either side of center 945, while reverting to a lower pitch for subsequent turns in either direction.

It will be recognized that other clamp shapes could be used in place of that illustrated for clamp 1002. More broadly, the springs and clamps variously described in the above Specification admit to considerable variation in detail. It should be understood that the embodiments mentioned herein are illustrative of the present invention. Numerous design modifications and variations in use of the invention may be contemplated in view of the following claims without straying from the intended scope of the invention herein disclosed.

What is claimed is:

1. A soft clamping system for transferring to a spring wire a transverse force exerted across a local wire path of the spring wire, the soft clamping system comprising:
   a. a clamp body, including two rigid components capable of placement on opposing sides of a length of the spring wire to be clamped;
   b. force transfer means couplable to said clamp body, wherein said force transfer means is capable of transmitting the transverse force between an external load and said clamp body;
   c. preload means couplable to said clamp body, wherein said preload means is designed to force said two rigid components toward each other; and
   d. soft bushing means, placeable between said two rigid components and said length of spring wire, wherein said soft bushing means is compressed by said preload means such that stress, in at least part of said soft bushing means, includes a component of hydrostatic pressure, said component being compressive and having an average magnitude exceeding a maximum magnitude of shear stress produced anywhere in said at least part of said soft bushing means during use of the soft clamping system.

2. The clamping system as claimed in claim 1 wherein the soft bushing means is a bushing formed of a rubber material.

3. The clamping system as claimed in claim 2 wherein said bushing is unitary, wherein the average radial thickness of said bushing is less than 15% of the average diameter dimension of said length of spring wire, and wherein said at least part of said bushing excludes bushing material close to the axial extremes of said bushing.

4. A spring system comprising a spring body formed of a selectable material and having a length dimension, a width dimension, and a middle region, the spring system further comprising:
   a. dual static attachments attachable on either side of said spring body in said width dimension, wherein said spring body is a formed wire;
   b. a single moving attachment attachable in said middle section of said spring body; and
   c. push-pull operation means couplable through said single moving attachment to said spring body in an axial dimension about a center-neutral position thereof,
   wherein there is substantially no mechanical fixturing preload of said spring body, wherein said spring body is subjectable to high cyclic stress in push-pull operation of said push-pull operation means,
   wherein said spring body includes a continuous and unbroken span bridging between said dual static attachments and said single moving attachment and bridging across said middle section associated with said moving attachment, and
   wherein a lateral dimension of said continuous and unbroken span of said spring body exceeds the maximum extent of said unbroken span in said axial dimension.

5. The spring system of claim 4 wherein said spring body comprises a first helical region and a second helical region, wherein said first and second helical regions are side by side and share the same handedness, wherein an axis of said first helical region and an axis of said second helical region are substantially parallel, and wherein said spring body includes a middle region continuous with said first and second helical regions and joining said first and second helical regions together.

6. A spring system comprising:
   a. a spring body formed of an unbroken length of spring wire, said spring body having a first helical region, a second helical region and a middle region continuous with said first and second helical regions and joining said first and second helical regions together, wherein said first and second helical regions are side by side and share the same handedness, and wherein an axis of said first helical region and an axis of said second helical region are substantially parallel, and wherein said spring body has a length dimension and a width dimension,
   b. dual static attachments attachable on either side of said spring body in said width dimension;
   c. a single moving attachment attachable in said middle section of said spring body; and
   d. push-pull operation means couplable through said single moving attachment to said spring body in an axial dimension about a center-neutral position thereof,
   wherein said spring body is subjectable to high cyclic stress in push-pull operation of said push-pull operation means, wherein said spring body includes a continuous and unbroken span bridging between said dual static attachments and said single moving attachment and bridging across said middle section associated with said moving attachment, and wherein a lateral dimension of said continuous and unbroken span of said spring body exceeds the maximum extent of said unbroken span in said axial dimension.

\* \* \* \* \*